(12) United States Patent
Tsukagoshi

(10) Patent No.: US 9,787,968 B2
(45) Date of Patent: Oct. 10, 2017

(54) TRANSMISSION APPARATUS, TRANSMISSION METHOD, RECEPTION APPARATUS, RECEPTION METHOD, AND TRANSMISSION/RECEPTION SYSTEM USING AUDIO COMPRESSION DATA STREAM AS A CONTAINER OF OTHER INFORMATION

(75) Inventor: Ikuo Tsukagoshi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 1049 days.

(21) Appl. No.: 13/111,701

(22) Filed: May 19, 2011

(65) Prior Publication Data

US 2011/0292173 A1   Dec. 1, 2011

(30) Foreign Application Priority Data

May 26, 2010  (JP) ............................. P2010-121044

(51) Int. Cl.
   *H04N 13/00*  (2006.01)
   *H04N 7/24*  (2011.01)
   *H04N 19/597*  (2014.01)

(52) U.S. Cl.
   CPC ............ *H04N 13/007* (2013.01); *H04N 7/24* (2013.01); *H04N 13/0048* (2013.01);
   (Continued)

(58) Field of Classification Search
   None
   See application file for complete search history.

(56) References Cited

U.S. PATENT DOCUMENTS

| 5,396,497 A | 3/1995 | Veltman |
| 2002/0080044 A1* | 6/2002 | Kang ..................... G08C 19/28 340/12.22 |

(Continued)

FOREIGN PATENT DOCUMENTS

| CN | 1013999 B | 9/1991 |
| CN | 1684523 A | 10/2005 |

(Continued)

OTHER PUBLICATIONS

High-Definition Multimedia Interface Specification Version 1.4, Jun. 5, 2009; pp. i-197; Supplement 1—Consumer Electronics Control (CEC), pp. CEC i-CEC 127; Supplement 2—HDMI Ethernet and Audio Return Channel (HEAC), pp. HEAC i-HEAC 72.

(Continued)

*Primary Examiner* — Joseph Ustaris
*Assistant Examiner* — Edemio Navas, Jr.
(74) *Attorney, Agent, or Firm* — Lerner, David, Littenberg, Krumholz & Mentlik, LLP

(57) ABSTRACT

A transmission apparatus includes a first data stream generation unit, a second data stream generation unit, and a data transmission unit. The first data stream generation unit generates an image compression data stream. The second data stream generation unit generates a audio compression data stream to which specific information which is not directly related to audio data is added. The data transmission unit multiplexes the image compression data stream generated by the first data stream generation unit and the audio compression data stream generated by the second data stream generation unit, and transmits the resulting data stream.

15 Claims, 19 Drawing Sheets

(52) U.S. Cl.
CPC ....... *H04N 13/0066* (2013.01); *H04N 19/597* (2014.11); *H04N 2213/003* (2013.01); *H04N 2213/005* (2013.01)

(56) References Cited

U.S. PATENT DOCUMENTS

| | | | |
|---|---|---|---|
| 2007/0028278 A1* | 2/2007 | Sigmon et al. | 725/113 |
| 2007/0089158 A1* | 4/2007 | Clark | 725/135 |
| 2007/0127724 A1* | 6/2007 | Kim | 381/1 |
| 2007/0162568 A1* | 7/2007 | Gupta | G06Q 30/0242 709/219 |
| 2007/0234397 A1* | 10/2007 | Pearson et al. | 725/137 |
| 2008/0010372 A1* | 1/2008 | Khedouri et al. | 709/224 |
| 2008/0141317 A1* | 6/2008 | Radloff | H04N 5/44582 725/87 |
| 2009/0089850 A1* | 4/2009 | Nakajima et al. | 725/118 |
| 2009/0123066 A1* | 5/2009 | Moriya | H04N 19/139 382/166 |
| 2009/0131105 A1* | 5/2009 | Shanahan | 455/556.1 |
| 2009/0142041 A1* | 6/2009 | Nagasawa et al. | 386/124 |
| 2009/0172462 A1* | 7/2009 | Rothman | G06F 11/0793 714/2 |
| 2009/0284584 A1* | 11/2009 | Wakabayashi et al. | 348/44 |

FOREIGN PATENT DOCUMENTS

| | | | |
|---|---|---|---|
| CN | 1976478 A | | 6/2007 |
| CN | 101399947 A | | 4/2009 |
| JP | 2000165825 A | | 6/2000 |
| JP | 2000173174 A | | 6/2000 |
| JP | 2002541684 A | | 12/2002 |
| JP | 2004-274125 A | | 9/2004 |
| JP | 2004297628 A | | 10/2004 |
| JP | 2005-006114 A | | 1/2005 |
| JP | 2005136675 A | | 5/2005 |
| JP | 2005515669 A | | 5/2005 |
| JP | 2005176107 A | | 6/2005 |
| JP | 2006128818 A | | 5/2006 |
| JP | 2006254022 A | | 9/2006 |
| JP | 2006287812 A | | 10/2006 |
| JP | 2006294120 A | | 10/2006 |
| JP | 2008117485 A | | 5/2008 |
| JP | 2009124349 A | | 6/2009 |
| JP | 2010014979 A | | 1/2010 |
| WO | 0045599 A2 | | 8/2000 |
| WO | 20100046824 A1 | | 4/2010 |

OTHER PUBLICATIONS

Chinese Office Action fo CN Application No. 201110130756.4, dated Feb. 6, 2015.
Japanese Office Action for JP Application No. 2011061549, dated Dec. 16, 2014.
Japanese Office Action for JP Application No. 2011061549, dated Jul. 7, 2015.
Japanese Office Action for Japanese Publication No. 20110161549 Dated Jan. 5, 2016.
Chinese Office Action for CN Application No. 201110130756.4, dated Oct. 19, 2015.
European Search Report for Application No. 11166504.8 dated Apr. 17, 2014.
Wikipedia: "Audio codec," internet article, Mar. 22, 2010 (Mar. 22, 2010)?XP002715998, Retrieved from the Internet: URL:http://en.wikipedia.org/w/index.php?title=Audio_codec &oldid=351425436 [retrieved on Nov. 7, 2013] * the whole document *.
Wikipedia: "MPEG-2 Transmission," internet article, Jan. 31, 2001 (Jan. 31, 2001), XP002715999, Retrieved from the Internet: URL:http://www.erg.abdn.ac.uk/future-net/digital-video/mpeg2-trans.html [retrieved on Nov. 7, 2013] * the whole document *.
European Office Action for Application No. 11166504.8 dated Jul. 27, 2016.
Japanese Office Action for Application No. 201161549 dated Oct. 25, 2016.
Taiwanese Office Action and Search Report for Application No. 100117047 dated Sep. 24, 2014.
Japanese Office Action for Application No. 2015198688 dated Nov. 1, 2016.

* cited by examiner

1920×1080p    1920×1080p

1920×1080i/p

1920×1080i/p

1920×1080i/p    1920×1080i/p

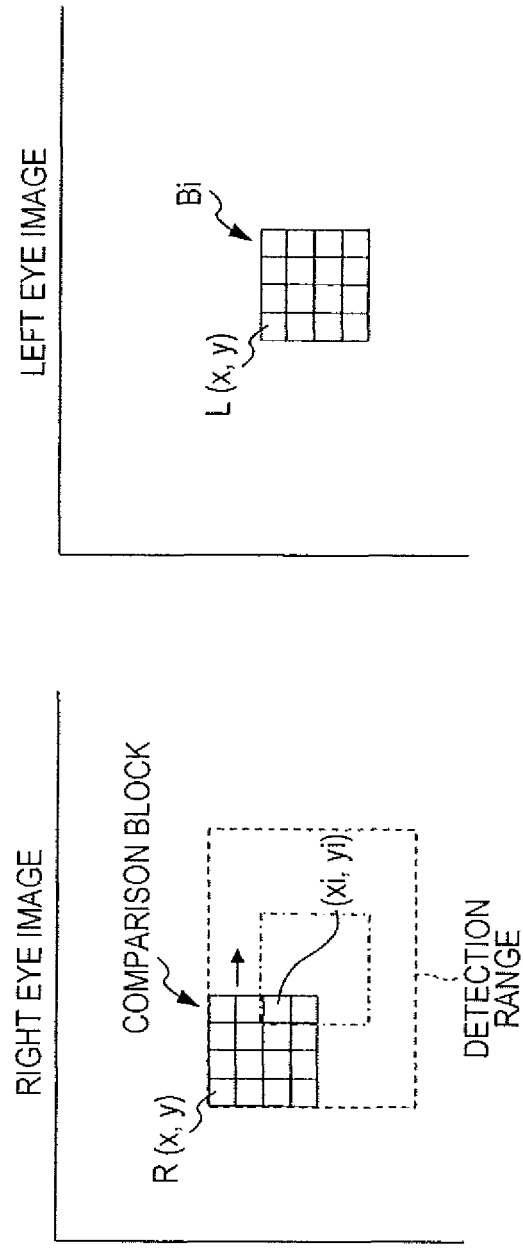

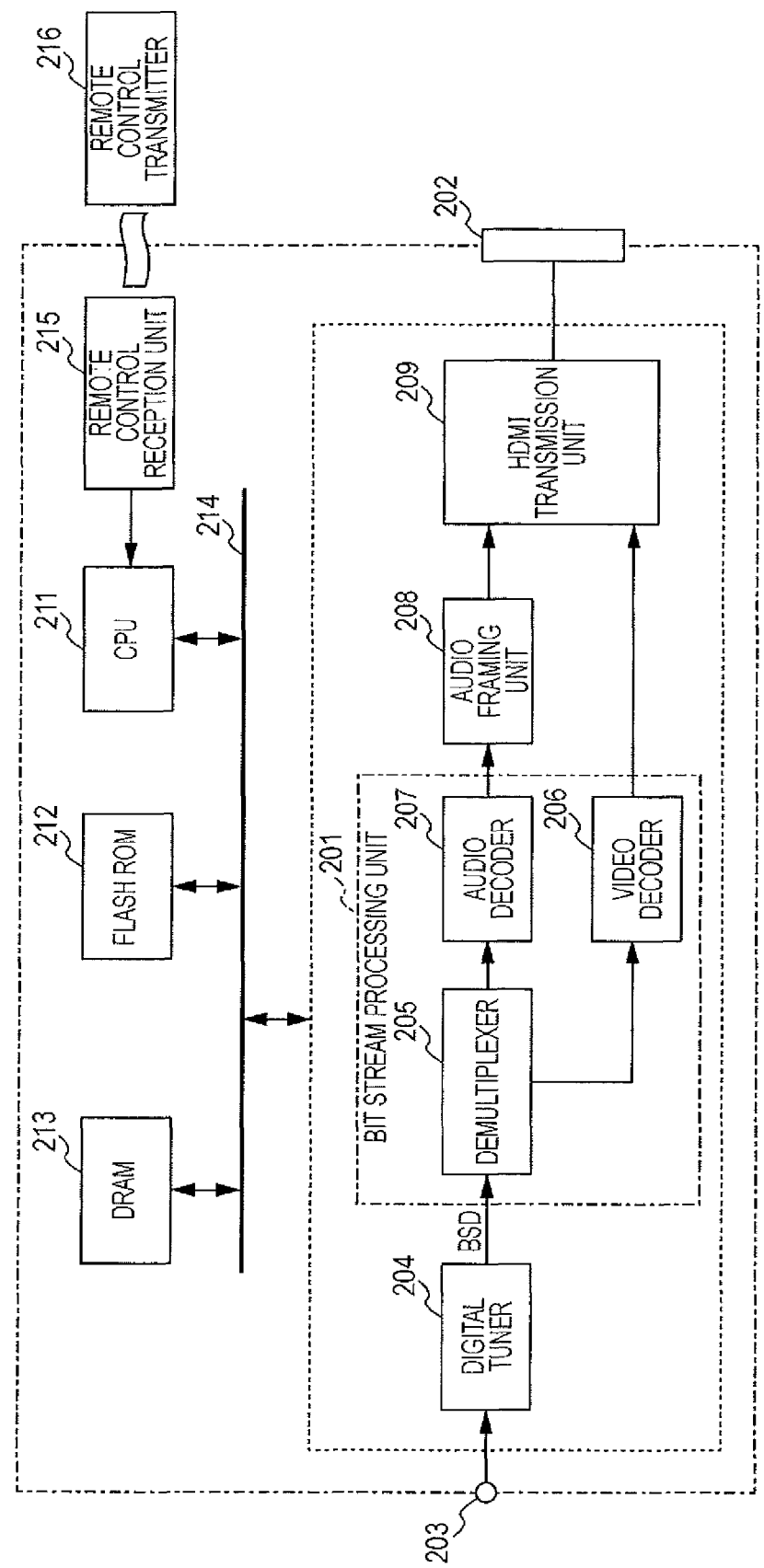

FIG. 13A

| Byte# | BITS | | | | | | | |
|---|---|---|---|---|---|---|---|---|
| | 7 | 6 | 5 | 4 | 3 | 2 | 1 | 0 |
| 1 | Audio Format Code = 0001 | | | | | Max Number of channels - 1 | | |
| 2 | 192 kHz | 176.4 kHz | 96 kHz | 88.2 kHz | 48 kHz | 44.1 kHz | 32 kHz | |
| 3 | | | | | 24 bits | 20 bits | 16 bits | |

FIG. 13B

| Byte# | BITS | | | | | | | |
|---|---|---|---|---|---|---|---|---|
| | 7 | 6 | 5 | 4 | 3 | 2 | 1 | 0 |
| 1 | Audio Format Code | | | | | Max Number of channels - 1 | | |
| 2 | 192 kHz | 176.4 kHz | 96 kHz | 88.2 kHz | 48 kHz | 44.1 kHz | 32 kHz | |
| 3 | MAXIMUM BIT RATE DIVIDED BY 8 kHz | | | | | | | |

FIG. 14

| CODES | AUDIO FORMAT DESCRIPTION |
|---|---|
| 0 | Reserved |
| 1 | Linear PCM (e.g., IEC 60958) |
| 2 | AC-3 |
| 3 | MPEG1 (Layers 1 & 2) |
| 4 | MP3 (MPEG1 Layer 3) |
| 5 | MPEG2 (multichannel) |
| 6 | AAC |
| ⋮ | ⋮ |

FIG. 15

| Byte# | 7 | 6 | 5 | 4 | 3 | 2 | 1 | 0 |
|---|---|---|---|---|---|---|---|---|
| 0 | Vendor-specific tag code (=3) | | | | | | | |
| 1 | Length (= N) | | | | | | | |
| 2 | 24-bit IEEE Registration Identifier (0x000C03) (least significant byte first) | | | | | | | |
| 3 | | | | | | | | |
| ... | ... | | | | | | | |
| 6 | Rsvd (0) | | | | | | FC_flg | |
| 7 | | | | | | | | |
| 8 | Rsvd (0) | | | | | | | |
| ... | ... | | | | | | | |
| (13) | Rsvd (0) | | | Rsvd (0) | | Rsvd (0) | | Rsvd (0) |
| ...N | ... | | | | | | | | understand# TRANSMISSION APPARATUS, TRANSMISSION METHOD, RECEPTION APPARATUS, RECEPTION METHOD, AND TRANSMISSION/RECEPTION SYSTEM USING AUDIO COMPRESSION DATA STREAM AS A CONTAINER OF OTHER INFORMATION

CROSS-REFERENCE TO RELATED APPLICATION

The present application claims priority from Japanese Patent Application No. JP 2010-121044 filed in the Japanese Patent Office on May 26, 2010, the entire content of which is incorporated herein by reference.

BACKGROUND OF THE INVENTION

The present disclosure relates to a transmission apparatus, a transmission method, a reception apparatus, a reception method, and a transmission/reception system, and, in particular, to a transmission apparatus or the like that simply transmits and obtains specific information together with image data and audio data.

In the related art, it is known that 3-Dimensional (3D) image data may be transmitted from a broadcasting station in order to display the 3D image data, the 3D image data is received by a Set Top Box (STB), and the 3D image data is transmitted to a Television (TV) receiver from the set top box using a digital interface, such as a High Definition Multimedia Interface (HDMI) standard. For example, High-Definition Multimedia Interface Specification Version 1.4, Jun. 5, 2009 discloses the specification of the HDMI standard.

For example, Japanese Unexamined Patent Application Publication No. 2005-6114 proposes a method of transmitting 3D image data using television broadcast waves. In this case, 3D image data including image data for a left eye and image data for a right eye is transmitted, and 3D image display is performed on the television receiver using binocular parallax.

FIG. 21 illustrates the relationship between the display locations of the right and left images of an object on a screen and the reproduction locations of the 3D images thereof when 3D image display is performed using binocular parallax. For example, with respect to an object A which is displayed on a screen in such a way that a left image La is out of alignment to the right side and a right image Ra is out of alignment to the left side as shown in the drawing, the right and left lines of sight cross in front of the screen surface, so that the reproduction location of the 3D image thereof is in the front of the screen surface.

Further, for example, with respect to an object B which is displayed in such a way that a left image Lb and a right image Rb are displayed on the screen in the same location as shown in the drawing, the right and left lines of sight cross at the screen surface, so that the reproduction location of the 3D image thereof is on the screen surface. Further, for example, with respect to an object C which is displayed on the screen in such a way that a left image Lc is out of alignment in the left side and a right image Rc is out of alignment in the right side as shown in the drawing, the right and left lines of sight cross behind the screen surface, so that the reproduction location of the 3D image thereof is behind the screen surface.

SUMMARY OF THE INVENTION

With respect to 3D image display as described above, a viewer commonly perceives the perspective of a 3D image using binocular parallax. With respect to superimposition information, such as an On Screen Display (OSD) display or the like, which is superimposed on an image, it is expected to be rendered in association with 3D image display as 3D sense of depth as well as 2-dimensional spatial sense. For example, when the OSD display is superimposed (overlay display) on a 3D image as superimposed display, a viewer may perceive a discrepancy in the perspective if the display is not performed in front of the nearest object in the depth direction within the image.

Here, it can be considered that parallax is assigned in such a way that parallax information corresponding to left eye image data and right eye image data which are included in 3D image data is transmitted to a television receiver together with the 3D image data, and superimposition information which is superimposed on a left eye image and a right eye image is shifted. Therefore, the superimposition information, such as OSD display or the like, which is superimposed on the 3D image can be displayed in front of the object within the closest image.

It is desirable to, for example, simply transmit information, such as parallax information or the like, from a broadcasting station or the like, so that the information can be used in a television receiver or the like.

A transmission apparatus according to an embodiment of the present disclosure includes a first data stream generation unit that generates an image compression data stream; a second data stream generation unit that generates a audio compression data stream to which specific information which is not directly related to audio data is added; and a data transmission unit that multiplexes the image compression data stream generated by the first data stream generation unit and the audio compression data stream generated by the second data stream generation unit, and transmits the resulting data stream.

In the present disclosure, the image compression data stream is generated by the first data stream generation unit. Further, the audio compression data stream is generated by the second data stream generation unit. The compression format is, for example, AC3, AAC, or the like. The specific information which is not directly related to audio data is added to the audio compression data stream. The specific information is inserted into, for example, the audio compression data stream as user data. For example, when the compression format is AC3, the specific information is inserted into an added data region (Aux region). Further, for example, when the compression format is AAC, the specific information is inserted as a Data Stream Element (DSE, user data).

In the present disclosure, for example, the image compression data stream includes image compression data in which 3-Dimensional (3D) image data having left eye image data and right eye image data used to display a 3D image is compressed and encoded, and the specific information which is added to the audio compression data stream is parallax information used to assign parallax by shifting superimposition information which is superimposed on an image based on the left eye image data and the right eye image data. Further, in the present disclosure, for example, the specific information which is added to the audio compression data stream is superimposition information data which is superimposed on an image based on the image compression data. Further, in the present disclosure, for example, the specific information which is added to the audio compression data stream is network access information used to obtain information related to the image compression data.

As described above, in the present disclosure, the specific information which is not directly related to audio data is added to the compression audio data stream and transmitted. Therefore, information, such as the parallax information, the superimposition information data, the network access information, or the like, can be simply transmitted from, for example, from a broadcasting station, a delivery server, or the like, by using the compression audio data stream as a container, and can be used in a television receiver or the like.

Further, a transmission apparatus according to another embodiment of the present disclosure includes a data obtainment unit that obtains a audio compression data stream to which specific information is added; and a data transmission unit that transmits the audio compression data stream obtained by the data obtainment unit to external equipment through a transmission path when the compression format of the audio compression data stream obtained by the data obtainment unit is a compression format which can be managed in the external equipment.

In the present disclosure, the audio compression data stream is obtained by the data obtainment unit. The compression format is, for example, AC3, AAC, or the like. The specific information, for example, information which is not directly related to audio data is added to the audio compression data stream. For example, the data obtainment unit obtains the audio compression data stream from a broadcasting signal, or from a streaming server through a network. Further, for example, the data obtainment unit obtains the audio compression data stream by reproducing it from a recording medium such as a disk or the like.

In the data transmission unit, it is determined whether the compression format of the audio compression data stream obtained by the data obtainment unit is a compression format which can be managed in external equipment or not. Thereafter, when the compression format of the audio compression data stream obtained by the data obtainment unit is the compression format which can be managed in external equipment, the audio compression data stream is transmitted to the external equipment through the transmission path.

In the present disclosure, for example, the data transmission unit transmits the audio compression data stream obtained by the data obtainment unit to the external equipment when the compression format of the audio compression data stream obtained by the data obtainment unit is a compression format which can be managed in the external equipment and the external equipment requests transmission of the audio compression data stream.

Further, the present disclosure further includes, for example, a decoding process unit that obtains non-compression audio data and the specific information by performing a decoding process on the audio compression data stream obtained by the data obtainment unit, and the data transmission unit may transmit the non-compression audio data and the specific information obtained by the decoding process unit to the external equipment through a transmission path at least when the compression format of the audio compression data stream obtained by the data obtainment unit is the compression format which can be managed in the external equipment, or the external equipment does not request the transmission of the audio compression data stream.

Further, in the present disclosure, for example, the data transmission unit may read and obtain information about the compression format of the audio compression data stream which can be managed in the external equipment and information which indicates whether the external equipment requests transmission of the audio compression data stream or not from a storage unit included in the external equipment through the transmission path.

Further, in the present disclosure, for example, the data transmission unit may further transmit 3D image data having left eye image data and right eye image data used to display a 3D image to the external equipment through the transmission path, and the specific information which is added to the audio compression data stream may be parallax information used to assign parallax by shifting superimposition information which is superimposed on an image based on the left eye image data and the right eye image data used to display the 3D image data.

Further, in the present disclosure, the data transmission unit may further transmit image data to the external equipment through the transmission path; and the specific information which is added to the audio compression data stream may be superimposition information data which is superimposed on an image based on the image data.

Further, in the present disclosure, the data transmission unit may further transmit image data to the external equipment through the transmission path, and the specific information which is added to the audio compression data stream may be network access information used to obtain information related to the image data.

As described above, in the present disclosure, when specific conditions are satisfied, the audio compression data stream to which the specific information is added is transmitted to the external equipment without change. Therefore, it is not necessary to perform a decoding process on the audio compression data stream, and information, such as the parallax information, the superimposition information data, the network access information, or the like, can be simply transmitted using the audio compression data stream as a container and can be used in a television receiver or the like.

A reception apparatus according to an embodiment of the present disclosure includes a data reception unit that receives a audio compression data stream, to which specific information is added, from external equipment through a transmission path, and a decoding process unit that obtains non-compression audio data and the specific information by performing a decoding process on the audio compression data stream received by the data reception unit.

In the present disclosure, the audio compression data stream is received by the data reception unit from the external equipment through the transmission path. The compression format thereof is, for example, AC3, AAC, or the like. Specific information is added to the audio compression data stream. Thereafter, a decoding process is performed on the audio compression data stream by the decoding process unit, so that the non-compression audio data and the specific information are obtained.

In the present disclosure, for example, the data reception unit may further receive 3D image data having left eye image data and right eye image data used to display a 3D image, the specific information obtained by the decoding process unit may be parallax information used to assign parallax by shifting superimposition information which is superimposed on an image including the left eye image data and the right eye image data used to display the 3D image data, and the reception apparatus may further include an image data processing unit that assigns the parallax to the same superimposition information which is superimposed on a left eye image and a right eye image using the left eye image data and the right eye image data included in the 3D image data received by the data reception unit and using the parallax information obtained by the decoding process unit, and that obtains data of the left eye image on which the superimposition information is superimposed and data of the right eye image on which the superimposition information is superimposed.

Further, in the present disclosure, for example, the data reception unit may further receive image data, and the specific information obtained by the decoding process unit may be superimposition information data which is superimposed on an image including image data received by the data reception unit, and the data reception unit may further include an image data processing unit that obtains data of the image to which the superimposition information is superimposed using the image data received by the data reception unit and the superimposition information data obtained by the decoding process unit.

Further, in the present disclosure, for example, the data reception unit may further receive image data, and the specific information obtained by the decoding process unit may be network access information used to obtain information related to the image data received by the data reception unit, and the reception apparatus may further include a network communication unit that obtains information related to the image data from a network using the network access information obtained by the decoding process unit.

As described above, in the present disclosure, the audio compression data stream to which the specific information is added can be received from the external equipment, and information, such as the added parallax information, the superimposition information data, the network access information, or the like, can be used.

According to the embodiments of the present disclosure, the information, such as the parallax information, the superimposition information data, the network access information, or the like, can be simply transmitted from a broadcasting station, a delivery server, or the like using the audio compression data stream as a container, and can be used in the television receiver or the like.

BRIEF DESCRIPTION OF THE DRAWINGS

FIG. 6 is a view illustrating a method of obtaining a parallax vector using a block matching method;

FIG. 8 is a block diagram illustrating an example of the configuration of a set top box included in the 3D image display system;

FIGS. 13A and 13B are views illustrating the specification of each "CEA short audio descriptor" of an "audio data block";

FIG. 14 is a view illustrating the relationship between "audio code" and "audio format" (some parts are extracted);

FIG. 15 is a view illustrating the structure of a Vendor Specific Data Block (VSDB) in an EDID structure;

DETAILED DESCRIPTION OF EMBODIMENTS

Hereinafter, an illustrative embodiment for realizing the present disclosure (hereinafter, referred to as an "embodiment") will be described. Meanwhile, the description will be performed in order as follows.

1. Embodiment
2. Modified Embodiment

1. Embodiment

Example of Configuration of 3D Image Display System

Figure 1:
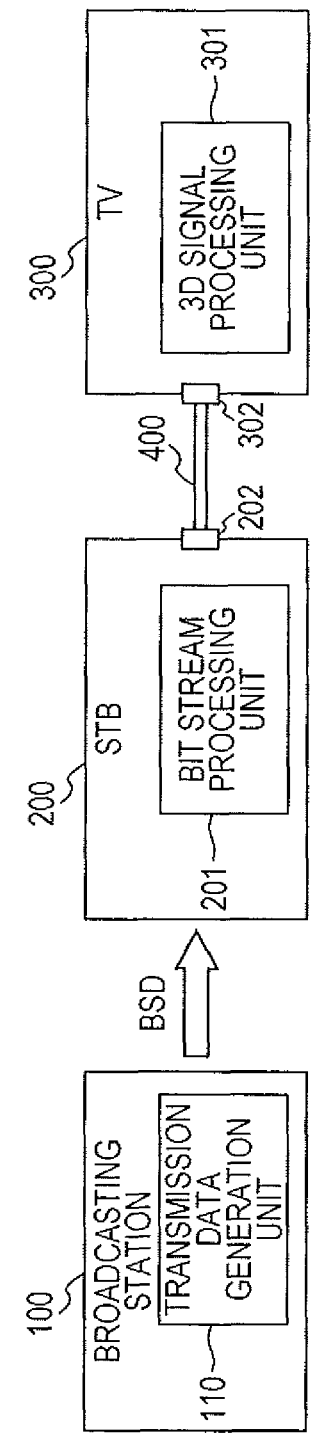
FIG. 1 is a block diagram illustrating an example of the configuration of a 3D image display system according to an embodiment of the present disclosure.

FIG. 1 illustrates an example of the configuration of a 3D image display system 10 as an embodiment. The 3D image display system 10 includes a broadcasting station 100, a Set Top Box (STB) 200, and a television receiver (TV) 300.

The set top box 200 and the television receiver 300 are connected through a High Definition Multimedia Interface (HDMI) cable 400. An HDMI terminal 202 is provided in the set top box 200. An HDMI terminal 302 is provided in the television receiver 300. An end of the HDMI cable 400 is connected to the HDMI terminal 202 of the set top box 200, and the other end of the HDMI cable 400 is connected to the HDMI terminal 302 of the television receiver 300.

Description of Broadcasting Station

The broadcasting station 100 inserts bit stream data BSD into a broadcast wave and transmits it. The broadcasting station 100 includes a transmission data generation unit 110 that generates the bit stream data BSD. The bit stream data BSD includes 3D image data having left eye image data and right eye image data, audio data, and, further, parallax information (parallax vector).

Example of Configuration of Transmission Data Generation Unit

Figure 2:
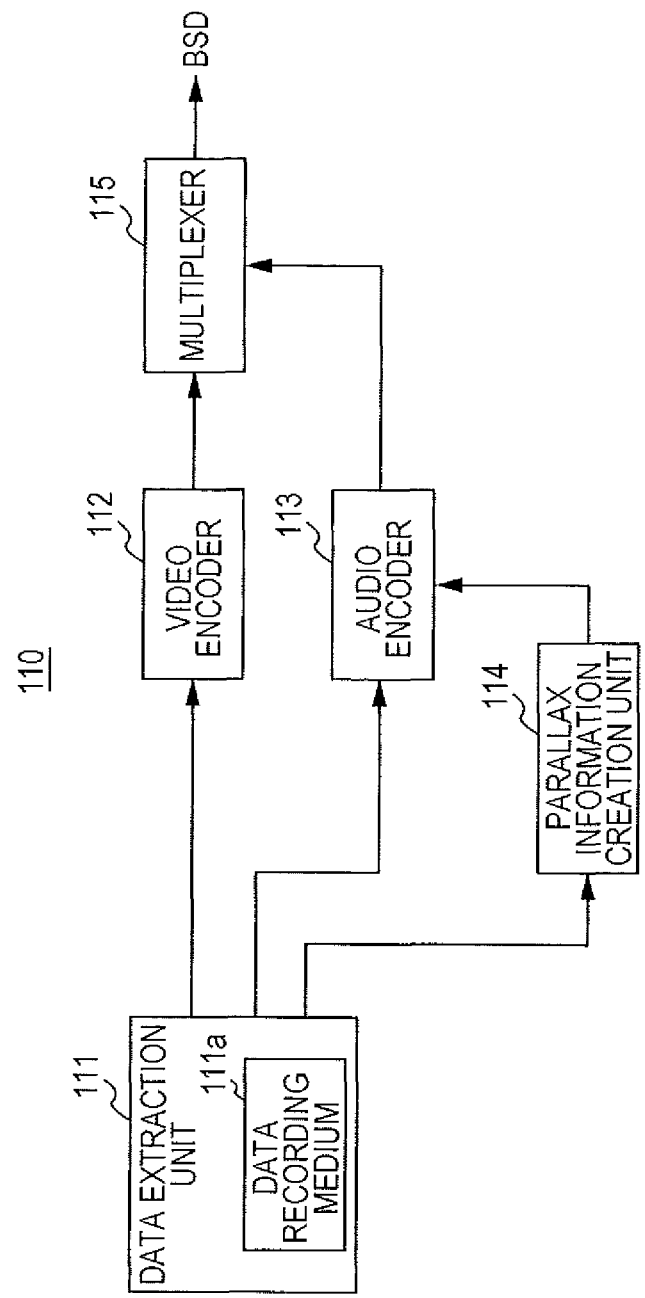
FIG. 2 is a block diagram illustrating an example of the configuration of the transmission data generation unit of a broadcasting station.

FIG. 2 illustrates an example of the configuration of the transmission data generation unit 110 that generates the above-described bit stream data BSD in the broadcasting station 100. The transmission data generation unit 110 includes a data extraction unit (archive unit) 111, a video encoder 112, an audio encoder 113, a parallax information creation unit 114, and a multiplexer 115.

A data recording medium 111a is, for example, detachably mounted on the data extraction unit 111. In the data recording medium 111a, the audio data and the parallax information are recorded together with the 3D image data having the left eye image data and the right eye image data while the audio data and the parallax information correspond to the 3D image data. The data extraction unit 111 extracts the 3D image data, the audio data, the parallax information or the like from the data recording medium 111a and outputs them. The data recording medium 111a is a disk-shaped recording medium, a semiconductor memory, or the like.

Figure 3:
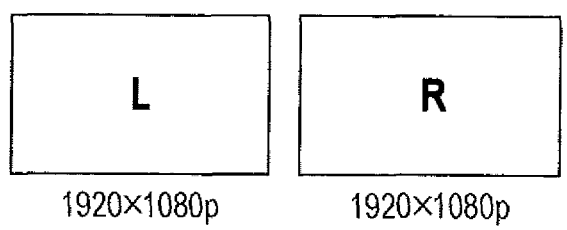
FIG. 3 is a view illustrating image data having a pixel format of 1920×1080p.

The 3D image data recorded in the data recording medium 111a is the 3D image data of a specific transmission method. An example of a transmission method of the 3D image data will be described. Although first to third transmission methods below are listed here, transmission methods, other than these, may be used. Further, here, an example of a case in which left eye L image data and right eye R image data respectively have a determined resolution, for example, a pixel format of 1920×1080p as shown in FIG. 3 will be described.

Figure 4A:
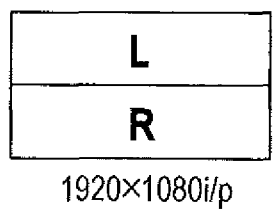
FIGS. 4A to 4C are views respectively illustrating a top and bottom method, a side by side method, and a frame sequential method which are included in a 3D image data transmission method.

The first transmission method is a top and bottom method, which transmits the data of each line of left eye image data in the first half in the vertical direction, and transmits the data of each line of right eye image data in the latter half in the vertical direction, as shown in FIG. 4A. In this case, since the left eye image data and the right eye image data have lines reduced by half, the vertical resolution is halved with respect to the original signal.

Figure 4B:
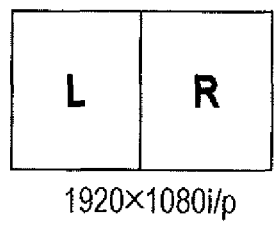

The second transmission method is a side by side method, which transmits the pixel data of left eye image data in the first half in the horizontal direction, and transmits the pixel data of right eye image data in the latter half in the horizontal direction, as shown in FIG. 4B. In this case, the left eye image data and the right eye image data respectively have the horizontal pixel data reduced by half. The horizontal resolution is halved with respect to the original signal.

Figure 4C:
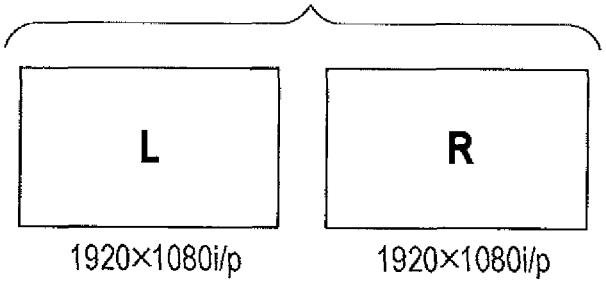

The third transmission method is a frame sequential method or a 2D backward-compatible method, which sequentially converts the left eye image data and the right eye image data for respective fields and transmits the resulting data, as shown in FIG. 4C.

Figure 5:
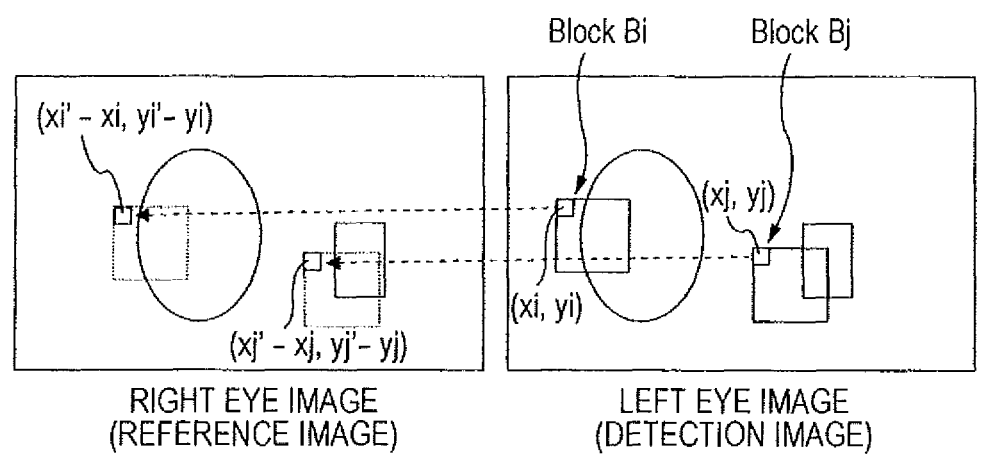
FIG. 5 is a view illustrating an example in which the parallax vector of a right eye image with respect to a left eye image is detected.

Further, the parallax information recorded in the data recording medium 111a is, for example, a parallax vector for each pixel included in an image. An example of the detection of a parallax vector will be described. Here, an example in which the parallax vector of a right eye image with respective to a left eye image will be described. As shown in FIG. 5, the left eye image serves as a detection image, and the right eye image serves as a reference image. In this example, parallax vectors at the locations (xi, yi) and (xj, yj) are detected.

An example of a case where the parallax vector at the location (xi, yi) is detected will be described. In this case, for example, an 8×8 or 16×16 pixel block (parallax detection block) Bi which has a pixel at the location (xi, yi) in the upper left portion thereof is set in the left eye image. Thereafter, a pixel block which matches with the pixel block Bi is detected in the right eye image.

In this case, a detection range centering on the location (xi, yi) is set in the right eye image, and each pixel in the detection range functions as a sequential focus pixel, so that, for example, an 8×8 or 16×16 comparison block which is the same as the above-described pixel block Bi is sequentially set.

Between the pixel block Bi and the sequentially set comparison block, the sum of differential absolute values for the respective corresponding pixels is obtained. Here, when the pixel value of the pixel block Bi is set to L(x, y) and the pixel value of the comparison block is set to R(x, y) as shown in FIG. 6, the sum of differential absolute values between the pixel block Bi and a specific comparison block is represented as $\Sigma |L(x, y)-R(x, y)|$.

When n pixels are included in the detection range set in the right eye image, n sums S1 to Sn are finally obtained, and the minimum S min is selected among them. Thereafter, the location (xi', yi') of the upper left pixel is obtained from the comparison block in which the total sum S min is obtained. Therefore, the parallax vector at the location (xi, yi), such as (xi'-xi, yi'-yi), is detected. Although the detailed description is omitted, with respect to a parallax vector at a location (xj, yj), for example, an 8×8 or 16×16 pixel block Bj which has a upper left pixel at the location (xj, yj) is set in the left eye image and detected using the same procedure.

Returning to FIG. 2, the parallax information creation unit 114 performs a downsizing process on the parallax information output from the data extraction unit 130, that is, a parallax vector for each pixel. Thereafter, the parallax information creation unit 114 creates and outputs a parallax vector set of each region, that is, parallax information set, which is obtained by dividing a picture region by a specific size. FIG. 7 illustrates an example of the downsizing process performed by the parallax information creation unit 114.

Figure 7B:
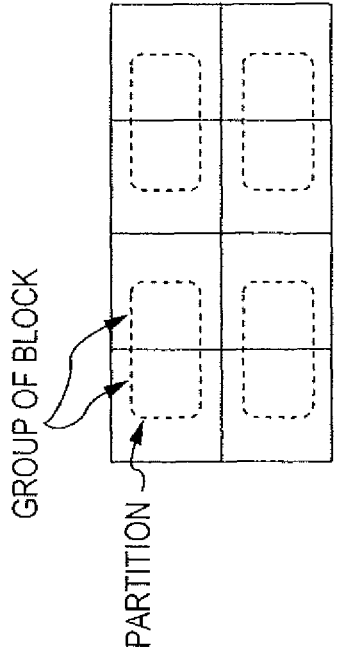
FIGS. 7A to 7D are views illustrating a downsizing process performed by the parallax information creation unit of the transmission data generation unit.
Figure 7D:
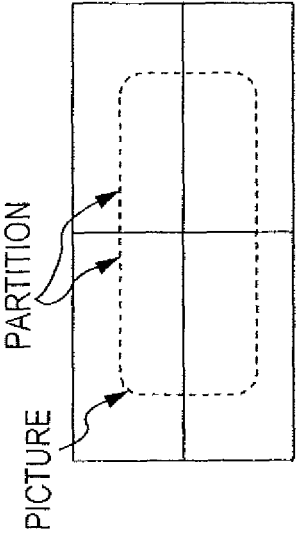
Figure 7A:
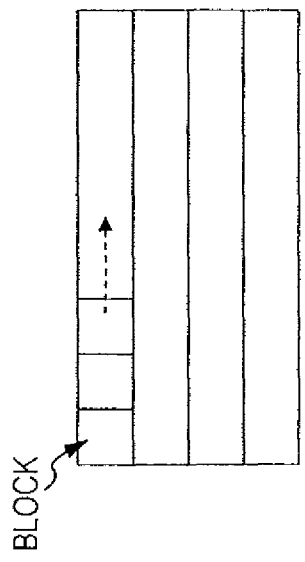

First, the parallax information creation unit 134 obtains a parallax vector for each block using a parallax vector for each pixel as shown in FIG. 7A. As described above, the block is configured in such a way that the picture region is divided by a specific size in the horizontal and vertical directions for each upper layer of the pixel located at the lowermost layer. Thereafter, the parallax vector of each block is obtained in such a way that a parallax vector having the largest value is selected from the parallax vectors of the all the pixels in the corresponding block.

Next, the parallax information creation unit 114 obtains a parallax vector for each group (group of blocks) using a parallax vector for each block as shown in FIG. 7B. The group is obtained by collecting and grouping a plurality of adjacent blocks for the upper layer of the block. In an example in FIG. 7B, each group includes four blocks bound with a dashed line frame. Thereafter, the parallax vector of each block is obtained in such a way that, for example, a parallax vector having the largest value is selected from the parallax vectors of all the blocks in the corresponding group.

Figure 7C:
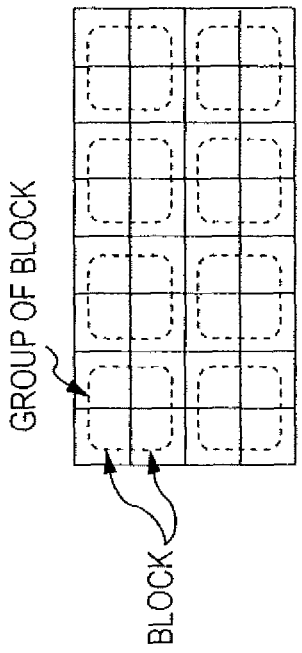

Next, the parallax information creation unit 114 obtains a parallax vector for each partition using a parallax vector for each group as shown in FIG. 7C. The partition is obtained by collecting and grouping a plurality of adjacent groups for the upper layer of the group. In an example in FIG. 7C, each partition includes two groups bound with a dashed line frame. Thereafter, the parallax vector of the partition is obtained in such a way that, for example, a parallax vector having the largest value is selected from the parallax vectors of all the groups included in the corresponding partition.

Next, the parallax information creation unit 114 obtains the parallax vector of the entire picture, which is located at the uppermost layer, using a parallax vector for each partition as shown in FIG. 7D. In an example of FIG. 7D, the entire picture includes four partitions bound with a dashed line frame. Thereafter, the parallax vector of the entire picture is obtained in such a way that, for example, a parallax vector having the largest value is selected from the parallax vectors of all the partitions included in the entire picture.

The parallax information creation unit 114 can obtain the parallax vector of each region of each layer of the block, group, partition, and the entire picture by performing the downsizing process on the parallax vector for each pixel which is located at the lowermost layer as described above. Meanwhile, in the example of the downsizing process shown in FIGS. 7A to 7D, the parallax vectors of four layers, that is, the block, the group, the partition, and the entire picture are finally obtained in addition to the layer of a pixel. However, the number of layers, the method of disconnecting the regions of each layer, and the number of regions are not limited thereto.

The parallax information creation unit 114 creates a set of the parallax vectors of each region of a specific layer using the above-described downsizing process, and outputs the set of the parallax vectors as a parallax information set. Meanwhile, the selection of the size of each region in which the parallax vector is obtained, that is, the selection of the layer, for example, is performed based on the spatial density, transmission band or the like of a parallax vector requested by a reception side.

Returning to FIG. 2, the video encoder 112 performs encoding, such as Moving Picture Experts Group (MPEG) 4-Advanced Video Coding (AVC), MPEG2, or Video Codec (VC)-1, on the 3D image data supplied from the data extraction unit 111, and creates an image compression data stream (video elementary stream). The audio encoder 113 performs encoding, such as AC3 or AAC, on audio data supplied from the data extraction unit 111, and creates audio compression data stream (audio elementary stream).

The audio encoder 113 adds the parallax information set created by the above-described parallax information creation unit 114 to the audio compression data stream. Here, the parallax information set is inserted into the audio compression data stream as user data. For example, when a compression format is AC3, the parallax information set is inserted into an additional data region (Aux region). Further, for example, when the compression format is AAC, specific information is inserted as a Data Stream Element (DSE, user data). Therefore, the parallax information set is transmitted using the audio compression data stream as a container. The parallax information set is used to assign parallax by shifting superimposition information (OSD display or the like) which is superimposed on an image including the left eye image data and the right eye image data in the television receiver 300, as described later.

The multiplexer 115 multiplexes the image compression data stream output from the video encoder 112 and the audio compression data stream output from the audio encoder 113. Thereafter, the multiplexer 115 creates and outputs bit stream data (transport stream) BSD as a multiplexed data stream.

The operation of the transmission data generation unit 110 shown in FIG. 2 will be described in brief. The 3D image data output from the data extraction unit 111 is supplied to the video encoder 112. In the video encoder 112, the encoding process, such as MPEG4-AVC, MPEG2, VC-1, or the like, is performed on the 3D image data, and the image compression data stream (video elementary stream) including encoded video data is created. The image compression data stream is supplied to the multiplexer 115.

Further, the parallax vector for each pixel, which is output from the data extraction unit 111, is supplied to the parallax information creation unit 114, and a downsizing process is performed thereon. In the parallax information creation unit 114, the parallax vector set of each region obtained in such a way that a picture region is divided by a specific size, that is, the parallax information set, is created. The parallax information set is supplied to the audio encoder 113.

Further, the audio data output from the data extraction unit 111 is supplied to the audio encoder 113. In the audio encoder 111, the encoding process, such as AC3, AAC, or the like, is performed with respect to the audio data supplied from the data extraction unit 111, and audio compression data stream (audio elementary stream) is generated.

Further, in the audio encoder 113, the parallax information set created in the above-described parallax information creation unit 114 is added to the audio compression data stream. In this case, the parallax information set is inserted into the audio compression data stream as user data. The audio compression data stream to which the parallax information set is added as described above is supplied to the multiplexer 115.

To the multiplexer 115, the image compression data stream is supplied from the video encoder 112 and the audio compression data stream to which the parallax information set is added is supplied from the audio encoder 113 as described above. Thereafter, in the multiplexer 115, the compression data streams (elementary streams) supplied from the respective encoders are packetized and multiplexed, so that the bit stream data (transport stream) BSD is obtained as transmission data.

Description of Set Top Box

Returning to FIG. 1, the set top box 200 receives the bit stream data (transport stream) BSD which is inserted into the broadcast waves and then transmitted from the broadcasting station 100. The bit stream data BSD includes 3D image data, including left eye image data and right eye image data, audio data, a parallax information set, and the like. The set top box 200 includes a bit stream processing unit 201.

The bit stream processing unit 201 obtains non-compression 3D image data from the bit stream data BSD. Further, the bit stream processing unit 201 obtains a audio compression data stream, or the non-compression audio data and the parallax information set from the bit stream data BSD.

FIG. 8 illustrates the example of the configuration of the set top box 200. The set top box 200 includes a bit stream processing unit 201, an HDMI terminal 202, an antenna terminal 203, a digital tuner 204, an audio framing unit 208, and an HDMI transmission unit 209. The bit stream processing unit 201 includes a demultiplexer 205, a video decoder 206, and an audio decoder 207. Further, the set top box 200 includes a Central Processing Unit (CPU) 211, a flash Read Only Memory (ROM) 212, a Dynamic Random Access Memory (DRAM) 213, an internal bus 214, a remote control reception unit 215, and a remote control transmitter 216.

The CPU 211 controls the operation of each unit of the set top box 200. The flash ROM 212 stores control software and data. The DRAM 213 configures the work area of the CPU 211. The CPU 211 runs the software by deploying software or data read from the flash ROM 212 on the DRAM 213, thereby controlling each unit of the set top box 200.

The remote control reception unit 215 receives a remote control signal (remote control code) transmitted from the remote control transmitter 216, and supplies the received remote control signal to the CPU 211. The CPU 211 controls each unit of the set top box 200 based on the remote control code. The CPU 211, the flash ROM 212, and the DRAM 213 are connected to the internal bus 214.

The antenna terminal 203 is a terminal used to input a television broadcasting signal received by a reception antenna (not shown). The digital tuner 204 processes the television broadcasting signal input to the antenna terminal 203, and outputs specific bit stream data (transport stream) BSD corresponding to a user selection channel.

The bit stream processing unit 201 obtains the 3D image data from the bit stream data BSD as described above, and further obtains the audio compression data stream, or non-compression audio data and the parallax information set. The demultiplexer 205 extracts video and audio elementary stream packets from the bit stream data BSD, and transmits the packets to the respective decoders.

The video decoder 206 performs a reverse process to the video encoder 112 of the above-described transmission data generation unit 110. That is, the video decoder 206 reconstructs the video elementary stream (image compression data stream) from the video packet extracted by the demultiplexer 205, and performs a decoding process, thereby obtaining non-compression 3D image data including the left eye image data and the right eye image data. The transmission method of the 3D image data includes, for example, the above-described first transmission method (top and bottom method), the second transmission method (side by side method), the third transmission method (frame sequential method), and the like (refer to FIGS. 4A to 4C).

The audio decoder 207 performs a reverse process to the above-described audio encoder 113 of the transmission data generation unit 110. The audio decoder 207 reconstructs the audio elementary stream (audio compression data stream) from the audio packet extracted by the demultiplexer 205, and performs a decoding process, thereby obtaining non-compression audio data (Process Control Monitor (PCM) data) and the parallax information set. However, the audio decoder 207 does not perform the decoding process on the compression audio data stream and directly outputs the compression audio data stream without change in the below case, that is, in the case where the compression format of the compression audio data stream can be managed in the television receiver 300 and the television receiver 300 requests the transmission of the compression audio data stream.

The process of the above-described audio decoder 207 is performed under the control of the CPU 211. The CPU 211 obtains Enhanced Extended Display Identification Data (E-EDID) from the television receiver 300 as described below. The CPU 211 performs control based on information (compression compulsory flag information) which indicates whether the transmission of information about the compression format of the audio compression data stream which can be managed in the television receiver 300 and the audio compression data stream, which are included in the E-EDID, is requested or not.

Figure 9:
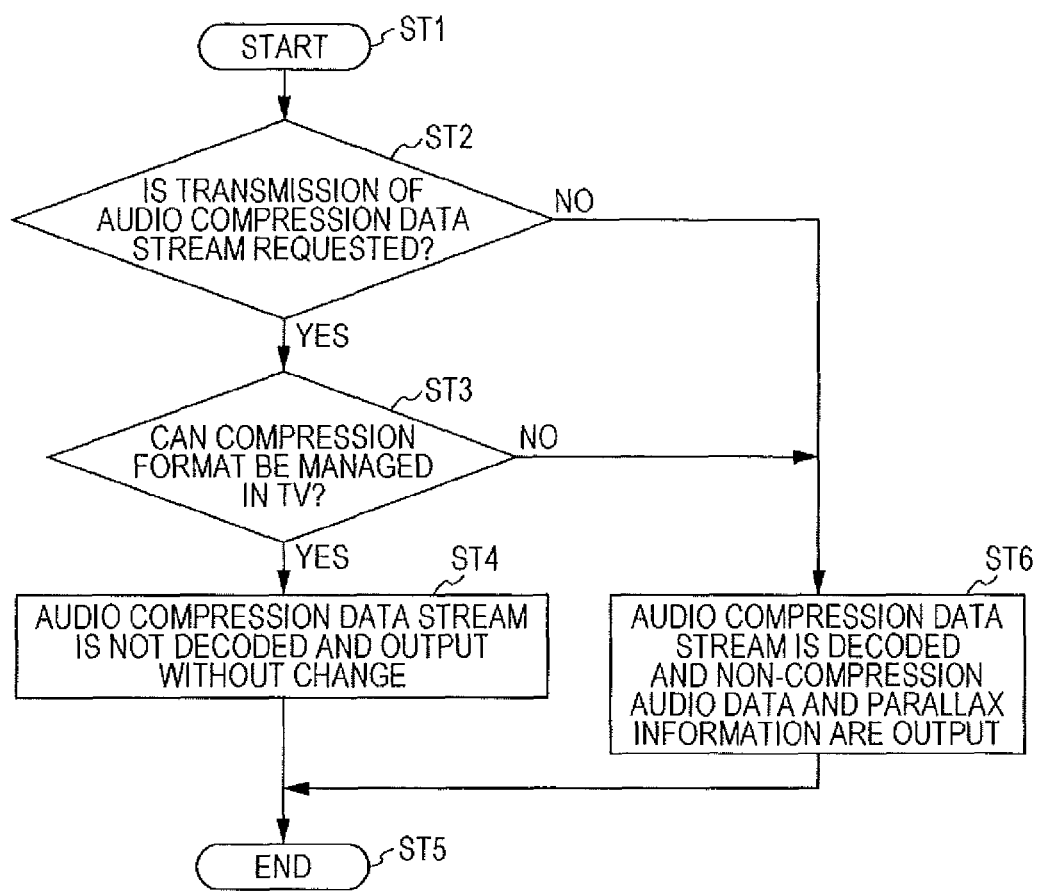
FIG. 9 is a flowchart illustrating an example of the procedure of the control process of the Central Processing Unit (CPU) of the set top box.

The flowchart of FIG. 9 illustrates an example of the procedure of the control process of the CPU 211. The CPU 211 starts a process in step ST1, and proceeds to a process of step ST2 thereafter. In step ST2, the CPU 211 determines whether the television receiver 300 requests the transmission of the audio compression data stream or not based on the compression compulsory flag information. When the transmission is requested, the CPU 211 proceeds to a process of step ST3.

In step ST3, the CPU 211 determines whether the compression format can be managed in the television receiver 300 or not. When the compression format can be managed in the television receiver 300, the CPU 211 controls the audio decoder 207 so that the audio compression data stream is not decoded and output without change in step ST4. The CPU 211 terminates the control process in step ST5 after performing the process of step ST4.

When the television receiver 300 does not request the transmission of the audio compression data stream in step ST2, the CPU 211 proceeds to the process of step ST6. Further, when the compression format of the received audio compression data stream in step ST3 is not the compression format which can be managed in the television receiver 300, the CPU 211 proceeds to the process of step ST6. In step ST6, the CPU 211 controls the audio decoder 207 so that the audio compression data stream is decoded, and the non-compression audio data and the parallax information set are output. The CPU 211 terminates the control process in step ST5 after performing the process of step ST6.

The audio framing unit 208 performs framing on the output of the audio decoder 207 conforming to International Electro-technical Commission (IEC) 60958. When the audio compression data stream is output from the audio decoder 207, the audio framing unit 208 performs framing on the audio compression data stream conforming to IEC 60958. Further, when the non-compression audio data and the parallax information set are output from the audio decoder 207, the audio framing unit 208 inserts the parallax information set into an added data region (Aux region) while performing framing on the non-compression audio data conforming to IEC 60958.

The HDMI transmission unit 209 causes the 3D image data and the audio data to be transmitted from the HDMI terminal 202 using communication conforming to HDMI. The HDMI transmission unit 209 is in a state where the HDMI transmission unit 209 is able to manage the 3D image data. The HDMI transmission unit 209 packs and outputs image and audio data to the HDMI terminal 202 in order to transmit the data through the TDMS channel of the HDMI. The transmission unit 209 will be described in detail below.

The operation of the set top box 200 will be described in brief. The television broadcasting signal input to the antenna terminal 203 is supplied to the digital tuner 204. In the digital tuner 204, the television broadcasting signal is processed and specific bit stream data (transport stream) BSD corresponding to a user selection channel is output.

The bit stream data BSD output from the digital tuner 204 is supplied to the demultiplexer 205 which constructs the bit stream processing unit 201. In the demultiplexer 205, the video and audio elementary stream packets are extracted from the bit stream data BSD and transmitted to the respective decoders.

In the video decoder 206, the video elementary stream (image compression data stream) is reconstructed based on the video packet extracted by the demultiplexer 205. Thereafter, in the video decoder 206, a decoding process is performed on the image compression data stream, so that the 3D image data including the left eye image data and the right eye image data is obtained. The 3D image data is supplied to the HDMI transmission unit 209.

Further, in the audio decoder 207, the audio elementary stream (audio compression data stream) is reconstructed based on the audio packet extracted by the demultiplexer 205. Thereafter, when the compression format can be managed in the television receiver 300 and the television receiver 300 requests the transmission of the compression audio data stream, the audio compression data stream is output from the audio decoder 207 without change.

Further, at least when the compression format is not managed in the television receiver 300 or when the television receiver 300 does not request the transmission of the compression audio data stream, the decoding process is performed in the audio decoder 207. In this case, in the audio decoder 207, the decoding process is performed on the reconstructed compression audio data stream, so that the non-compression audio data (PCM data) and the parallax information set are obtained.

The output of the audio decoder 207 is supplied to the audio framing unit 208. In the audio framing unit 208, framing is performed on the output of the audio decoder 207 conforming to IEC 60958. When the audio compression data stream is output from the audio decoder 207, framing is performed on the audio compression data stream conforming to IEC 60958 in the audio framing unit 208. Further, when the non-compression audio data and the parallax information set are output from the audio decoder 207, framing is performed on the non-compression audio data conforming to IEC 60958 and the parallax information set is inserted into the added data region (Aux region) in the audio framing unit 208.

The output of the audio framing unit 208 is supplied to the HDMI transmission unit 209. In the HDMI transmission unit 209, the 3D image data and the audio data are packetized and transmitted to the HDMI cable 400 from the HDMI terminal 202.

Description of Television Receiver

Returning to FIG. 1, the television receiver 300 receives the 3D image data, audio data, or the like transmitted from the set top box 200 through the HDMI cable 400. The television receiver 300 includes a 3D signal processing unit 301. The 3D signal processing unit 301 performs a process (decoding process) corresponding to the transmission method on the 3D image data, thereby obtaining the left eye image data and the right eye image data.

Figure 10:
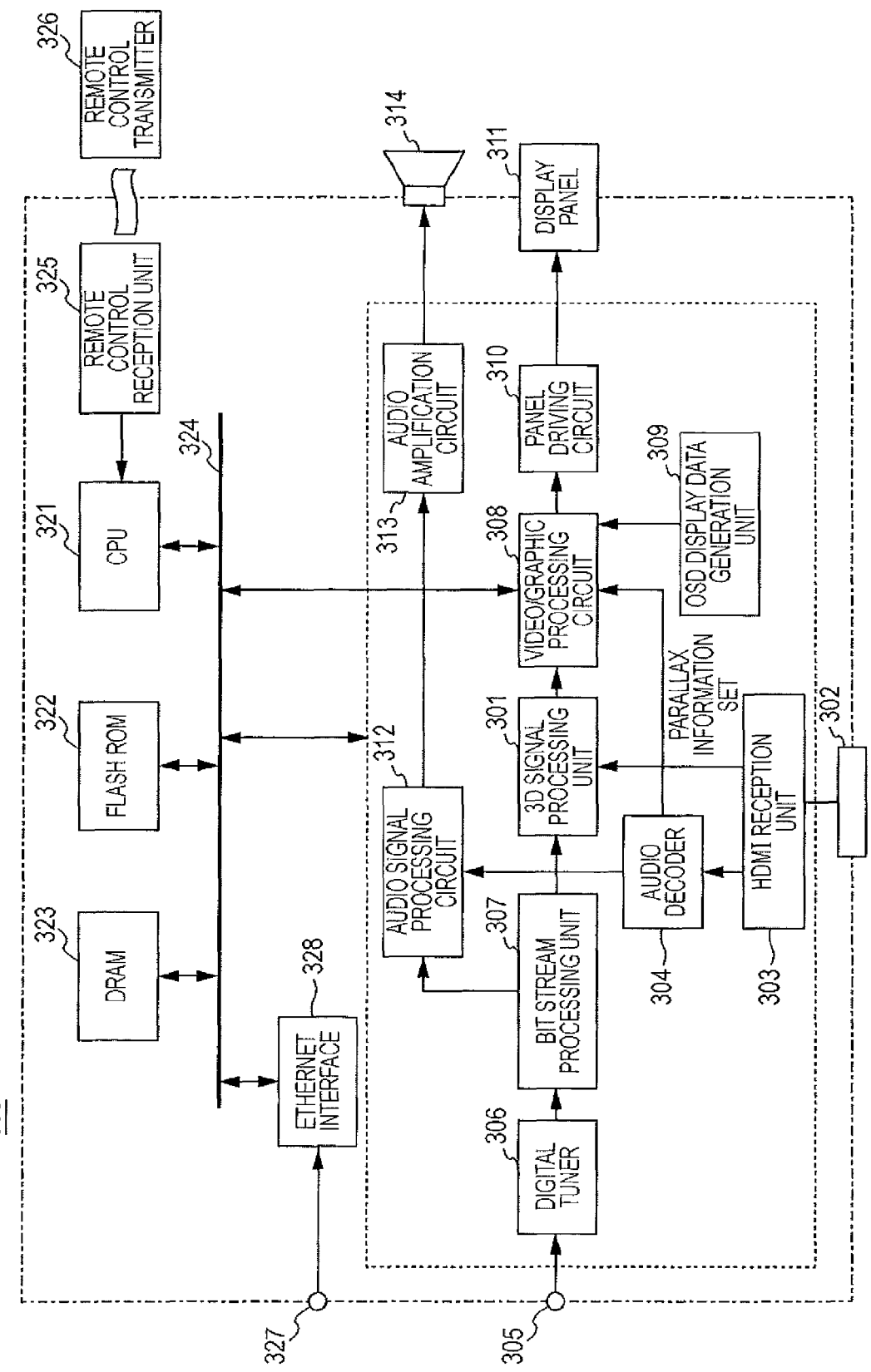
FIG. 10 is a block diagram illustrating an example of the configuration of a television receiver included in the 3D image display system.

FIG. 10 illustrates an example of the configuration of the television receiver 300. The television receiver 300 includes a 3D signal processing unit 301, an HDMI terminal 302, an HDMI reception unit 303, and an audio decoder 304. Further, the television receiver 300 includes an antenna terminal 305, a digital tuner 306, a bit stream processing unit 307, a video/graphic processing circuit 308, an OSD display data generation unit 309, a panel driving circuit 310, and a display panel 311.

Further, the television receiver 300 includes a audio signal processing circuit 312, a audio amplification circuit 313, and a speaker 314. Further, the television receiver 300 includes a CPU 321, a flash ROM 322, a DRAM 323, an internal bus 324, a remote control reception unit 325, a remote control transmitter 326, a network terminal 327, and an Ethernet interface 328. In addition, Ethernet is a registered trademark.

The CPU 321 controls the operation of each unit of the television receiver 300. The flash ROM 322 stores control software and data. The DRAM 323 constructs the work area of the CPU 321. The CPU 321 runs the software by deploying software or data read from the flash ROM 322 on the DRAM 323, thereby controlling each unit of the television receiver 300.

The remote control reception unit 325 receives a remote control signal (remote control code) transmitted from the remote control transmitter 326, and supplies the received remote control signal to the CPU 321. The CPU 321 controls each unit of the television receiver 300 based on the remote control code. The CPU 321, the flash ROM 322, and the DRAM 323 are connected to the internal bus 324.

The Ethernet interface 328 is connected to a network (not shown), such as the Internet, through the network terminal 327. The Ethernet interface 328 can obtain a variety of information which is displayed graphically using, for example, a widget, about weather forecasts, stock prices, or the like, through the network according to user manipulation. The Ethernet interface 328 is connected to the internal bus 324. The Ethernet interface 328 constructs a network communication unit.

The antenna terminal 305 is a terminal used to input a television broadcasting signal received by a reception antenna (not shown). The digital tuner 306 processes the television broadcasting signal input to the antenna terminal 305, and outputs specific bit stream data (transport stream) BSD corresponding to a user selection channel.

The bit stream processing unit 307 is configured the same as the bit stream processing unit 201 of the set top box 200 shown in FIG. 8. The bit stream processing unit 307 obtains non-compression 3D image data from the bit stream data BSD, and further obtains the non-compression audio data and the parallax information set.

The HDMI reception unit 303 receives the 3D image data and the audio data supplied to the HDMI terminal 302 through the HDMI cable 400 by communication conforming to DMI. The HDMI reception unit 303 is in a state where the HDMI reception unit 303 can manage the 3D image data. The HDMI reception unit 303 will be described in detail later.

Here, the audio data is any one of the below described in the part of the above-described set top box 200. That is, the audio data is the audio compression data stream to which the parallax information set is added as the user data or the non-compression audio data (PCM data) in which the parallax information set is inserted into the added data region (Aux region).

When the audio compression data stream to which the parallax information set is added as the user data in the HDMI reception unit 303 is received, the audio decoder 304 performs a decoding process and outputs the non-compression audio data (PCM data) and the parallax information set. Further, the audio decoder 304 outputs the non-compression audio data (PCM data) and the parallax information set without change when the non-compression audio data (PCM data) in which the parallax information set is inserted into the added data region (Aux region) in the HDMI reception unit 303 is received.

The 3D signal processing unit 301 performs a decoding process on the 3D image data received by the HDMI reception unit 303 or obtained by the bit stream processing unit 307, thereby generating left eye image data and right eye image data. In this case, the 3D signal processing unit 301 performs a decoding process corresponding to the transmission method thereof (refer to FIGS. 4A to 4C) on the 3D image data obtained by the bit stream processing unit 307. Further, the 3D signal processing unit 301 performs a decoding process corresponding to a Transmission Minimized Differential Signal (TDMS) transmission data structure on the 3D image data received by the HDMI reception unit 303.

The video/graphic processing circuit 308 generates image data in order to display a 3D image based on the left eye image data and the right eye image data generated by the 3D signal processing unit 301. Further, the video/graphic processing circuit 308 performs an image quality adjustment process on the image data, as necessary. Further, the video/graphic processing circuit 308 combines superimposition information data with the image data, as necessary.

The superimposition information data is, for example, OSD display data, such as a menu, or a program table, generated by the OSD display data generation unit 309. Further, the superimposition information data is, for example, the graphic display data of a widget. The video/graphic processing circuit 308 assigns parallax according to superimposition location to the same superimposition information to be superimposed on the left eye image and the right eye image. The video/graphic processing circuit 308 performs the parallax assignment process based on the parallax information set output from the audio decoder 304 or the parallax information set output from the bit stream processing unit 307. Thereafter, the video/graphic processing circuit 308 obtains left eye image data on which the superimposition information is superimposed and right eye image data on which the superimposition information is superimposed.

The panel driving circuit 310 drives the display panel 311 based on the image data output from the video/graphic processing circuit 308. The display panel 311 is configured with, for example, a Liquid Crystal Display (LCD), a Plasma Display Panel (PDP), or the like. Display is performed on the display panel 311 in order to display a 3D image. For example, the display panel 311 displays the left eye image based on the left eye image data and the right eye image based on the right eye image data alternating in a time division manner.

The audio signal processing circuit 312 performs a necessary process, such as Digital-to-Analog (D/A) conversion or the like, on the audio data which is output from the audio decoder 304 or which is obtained by the bit stream processing unit 307. The audio amplification circuit 313 amplifies a audio signal output from the audio signal processing circuit 312 and supplies the amplified audio signal to the speaker 314.

The operation of the television receiver 300 shown in FIG. 10 will be described in brief. In the HDMI reception unit 303, the 3D image data and the audio data transmitted from the set top box 200 connected to the HDMI terminal 302 are received. The 3D image data received by the HDMI reception unit 303 is supplied to the 3D signal processing unit 301.

Further, the audio data received by the HDMI reception unit 303 is supplied to the audio decoder 304. The audio data is the audio compression data stream to which the parallax information set is added as the user data, or the non-compression audio data (PCM data) in which the parallax information set is inserted into the added data region (Aux region).

In the audio decoder 304, when the audio data received by the HDMI reception unit 303 is the audio compression data stream, a decoding process is performed on the audio compression data stream, so that non-compression audio data (PCM data) and the parallax information set are obtained. Further, in the audio decoder 304, when the audio data received by the HDMI reception unit 303 is the non-compression audio data, the decoding process is not performed and the non-compression audio data and the parallax information set are output without change.

The non-compression audio data obtained by the audio decoder 304 is supplied to the audio signal processing circuit 312. Further, the parallax information set obtained by the audio decoder 304 is supplied to the video/graphic processing circuit 308.

The television broadcasting signal input to the antenna terminal 305 is supplied to the digital tuner 306. In the digital tuner 306, the television broadcasting signal is processed and specific bit stream data (transport stream) BSD corresponding to a user selection channel is output.

The bit stream data BSD output from the digital tuner 306 is supplied to the bit stream processing unit 307. In the bit stream processing unit 307, non-compression 3D image data is obtained from the bit stream data BSD and non-compression audio data and the parallax information set are further obtained.

The 3D image data obtained by the bit stream processing unit 307 is supplied to the 3D signal processing unit 301. Further, the non-compression audio data obtained by the bit stream processing unit 307 is supplied to the audio signal processing circuit 312. Further, the parallax information set obtained by the bit stream processing unit 307 is supplied to the video/graphic processing circuit 308.

In the 3D signal processing unit 301, a decoding process is performed on the 3D image data received by the HDMI reception unit 303 or obtained by the bit stream processing unit 307, so that the left eye image data and the right eye image data are generated. Further, in the video/graphic processing circuit 308, an image quality adjustment process is performed on the image data generated by the 3D signal processing unit 301, as necessary. Further, in the video/graphic processing circuit 308, the superimposition information data is combined with the image data, as necessary.

In this case, parallax is assigned to the same superimposition information (OSD display and the graphical display of a widget or the like), which is superimposed on the left eye image and the right eye image, based on the parallax information set. In this case, only the superimposition information which is superimposed on the left eye image, only the superimposition information which is superimposed on the right eye image, or both the sets of superimposition information is shifted according to the value of the parallax vector. The left eye image data on which the superimposition information is superimposed and the right eye image data on which the superimposition information is superimposed are obtained from the video/graphic processing circuit 308.

The left eye image data and the right eye image data obtained by the video/graphic processing circuit 308 are supplied to the panel driving circuit 310. Therefore, a 3D image is displayed by the display panel 311. For example, the left eye image based on the left eye image data and the right eye image based on the right eye image data are alternatingly displayed on the display panel 311 in a time division manner. A viewer wears shutter glasses in which a left eye shutter and a right eye shutter open alternating in synchronization with display on the display panel 311, so that the viewer can watch only the left eye image using the left eye and only the right eye image using the right eye, thereby perceiving the 3D image.

Further, in the audio signal processing circuit 312, a necessary process, such as D/A conversion or the like, is performed on the audio data obtained by the audio decoder 304 or the bit stream processing unit 307. The audio data is amplified by the audio amplification circuit 313, and then supplied to the speaker 314. Therefore, audio corresponding to the display image on the display panel 311 is output from the speaker 314.

Example of Configuration of HDMI Transmission Unit and HDMI Reception Unit

Figure 11:
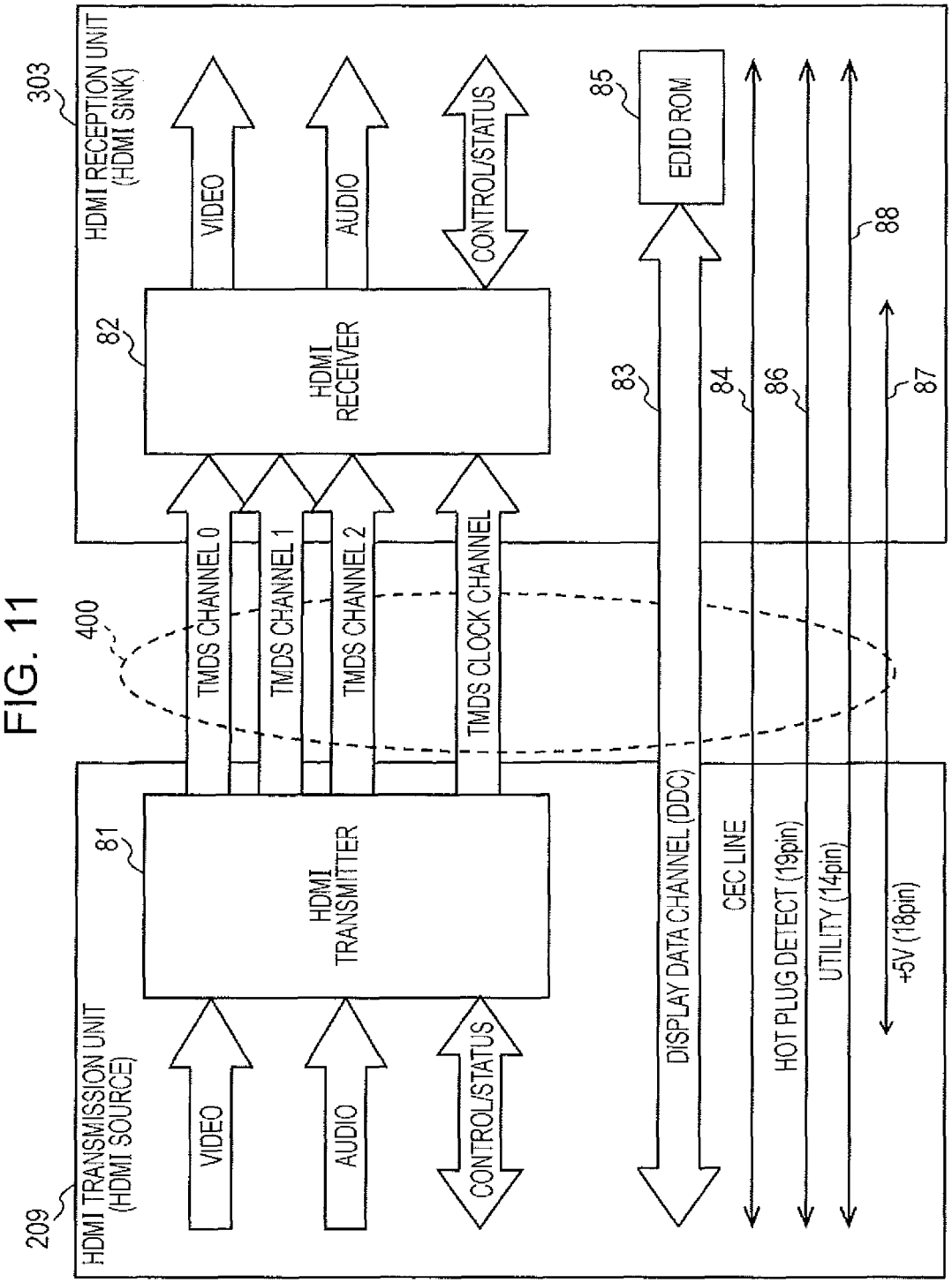
FIG. 11 is a view illustrating an example of the configuration of the HDMI transmission unit (HDMI source) of the set top box and the HDMI reception unit (HDMI sink) of the television receiver, which are included in the 3D image display system.

FIG. 11 illustrates an example of the configurations of the HDMI transmission unit (HDMI source) 209 of the set top box 200 and the HDMI reception unit (HDMI sink) 303 of the television receiver 300 in the 3D image display system 10 of FIG. 1.

The HDMI transmission unit 209 transmits a differential signal corresponding to the pixel data of an image corresponding to a single non-compression frame to the HDMI reception unit 303 using a plurality of channels in a single direction at a valid image interval (hereinafter, appropriately referred to as an active video interval). Here, the valid image interval is an interval in which a horizontal blanking interval and a vertical blanking interval are removed from an interval between a specific vertical synchronization signal and a subsequent vertical synchronization signal. Further, the HDMI transmission unit 209 transmits a differential signal corresponding to at least audio data or control data attached to an image, subsidiary data other than the audio data and the control data, or the like to the HDMI reception unit 303 using the plurality of channels in a single direction at the horizontal blanking interval or at the vertical blanking interval.

The transmission channel of an HDMI system having the HDMI transmission unit 209 and the HDMI reception unit 303 includes the following transmission channels. That is, there are three TDMS channels #0 to #2 as transmission channels used to transmit the pixel data and the audio data from the HDMI transmission unit 209 to the HDMI reception unit 303 in synchronization with a pixel clock in a single direction in series. Further, there is a TDMS clock channel as a transmission channel for transmitting the pixel clock.

The HDMI transmission unit 209 includes an HDMI transmitter 81. The transmitter 81, for example, converts the pixel data of a non-compression image into a corresponding differential signal, and transmits the resulting signal to the HDMI reception unit 303, connected thereto via the HDMI cable 400, using the three TDMS channels #0, #1, and #2 which are the plurality of channels in the single direction in series.

Further, the transmitter 81 converts the audio data accompanying the non-compression image, and the other subsidiary data other than necessary control data, or the like into a corresponding differential signal, and transmits the resulting signal to the HDMI reception unit 303 using the three TDMS channels #0, #1, and #2 in the single direction in series.

Further, the transmitter 81 transmits pixel clocks, which are synchronized with the pixel data transmitted using the three TDMS channels #0, #1, and #2, to the HDMI reception unit 303, which is connected through the HDMI cable 400, using the TDMS clock channel. Here, in a single TDMS channel #i (i=0, 1, 2), 10 bit-pixel data is transmitted at an interval of a single clock of the pixel clocks.

The HDMI reception unit 303 receives the differential signal corresponding to the pixel data which is transmitted from the HDMI transmission unit 209 in the single direction using the plurality of channels at an active video interval. Further, the HDMI reception unit 303 receives the differential signal corresponding to the audio data or control data which is transmitted from the HDMI transmission unit 209 in the single direction using the plurality of channels at the horizontal blanking interval or at the vertical blanking interval.

That is, the HDMI reception unit 303 includes an HDMI receiver 82. The HDMI receiver 82 receives the differential signal corresponding to the pixel data and the differential signal corresponding to the audio data or control data, which are transmitted from the HDMI transmission unit 209 in the single direction using the TDMS channels #0, #1, #2. In this case, the HDMI receiver 82 receives the differential signals in synchronization with the pixel clocks transmitted from the HDMI transmission unit 209 through the TDMS clock channel.

The transmission channel of the HDMI system includes transmission channels called a Display Data Channel (DDC) 83 and a Consumer Electronic Control (CEC) line 84 in addition to the above-described TDMS channels #0 to #2 and the TDMS clock channel. The DDC 83 includes two signal lines (not shown) included in the HDMI cable 400. The DDC 83 is used so that the HDMI transmission unit 209 reads the Enhanced Extended Display Identification Data (E-EDID) from the HDMI reception unit 303.

The HDMI reception unit 303 includes an EDID Read Only Memory (ROM) 85 that stores E-EDID which is information about performance related to self performance (configuration/capability), in addition to the HDMI receiver 81. The HDMI transmission unit 206 reads the E-EDID through the DDC 83 from the HDMI reception unit 303, which is connected through the HDMI cable 400, in response to a request from, for example, the CPU 211 (refer to FIG. 8)

The HDMI transmission unit 209 transmits the read E-EDID to the CPU 211. The CPU 211 stores the E-EDID in the flash ROM 212 or the DRAM 213. The E-EDID includes information about the compression format of the audio compression data stream which can be managed in the television receiver 300 and information (compression compulsory flag information) which indicates whether the television receiver 300 requests the transmission of the audio compression data stream as described above.

The CEC line 84 is configured to include a single signal line (not shown) included in the HDMI cable 400, and used to perform the bidirectional communication of the control data between the HDMI transmission unit 209 and the HDMI reception unit 303. The CEC line 84 constructs a control data line.

Further, the HDMI cable 400 includes a line (Hot Plug Detect (HPD) line) 86 connected to a pin called an HPD. A source device can detect the connection of a sink device using the corresponding line 86. Meanwhile, the HPD line 86 is used as a HEAC-line which constructs a bidirectional communication path. Further, the HDMI cable 400 includes an electric power line 87 used to supply electric power from the source device to the sink device. Further, the HDMI cable 400 includes a utility line 88. The utility line 88 is used as a HEAC+ line which constructs the bidirectional communication path.

Structure of E-EDID

As described above, the HDMI transmission unit 209 reads E-EDID through the DDC 83 from the HDMI reception unit 303, which is connected through the HDMI cable 400, in response to a request from, for example, the CPU 211 (refer to FIG. 8). Thereafter, the CPU 211 obtains the information about the compression format of the audio compression data stream which can be managed in the television receiver 300 and the information which indicates whether the transmission of the audio compression data stream is requested or not (compression compulsory flag information) from the E-EDID.

Figure 12:
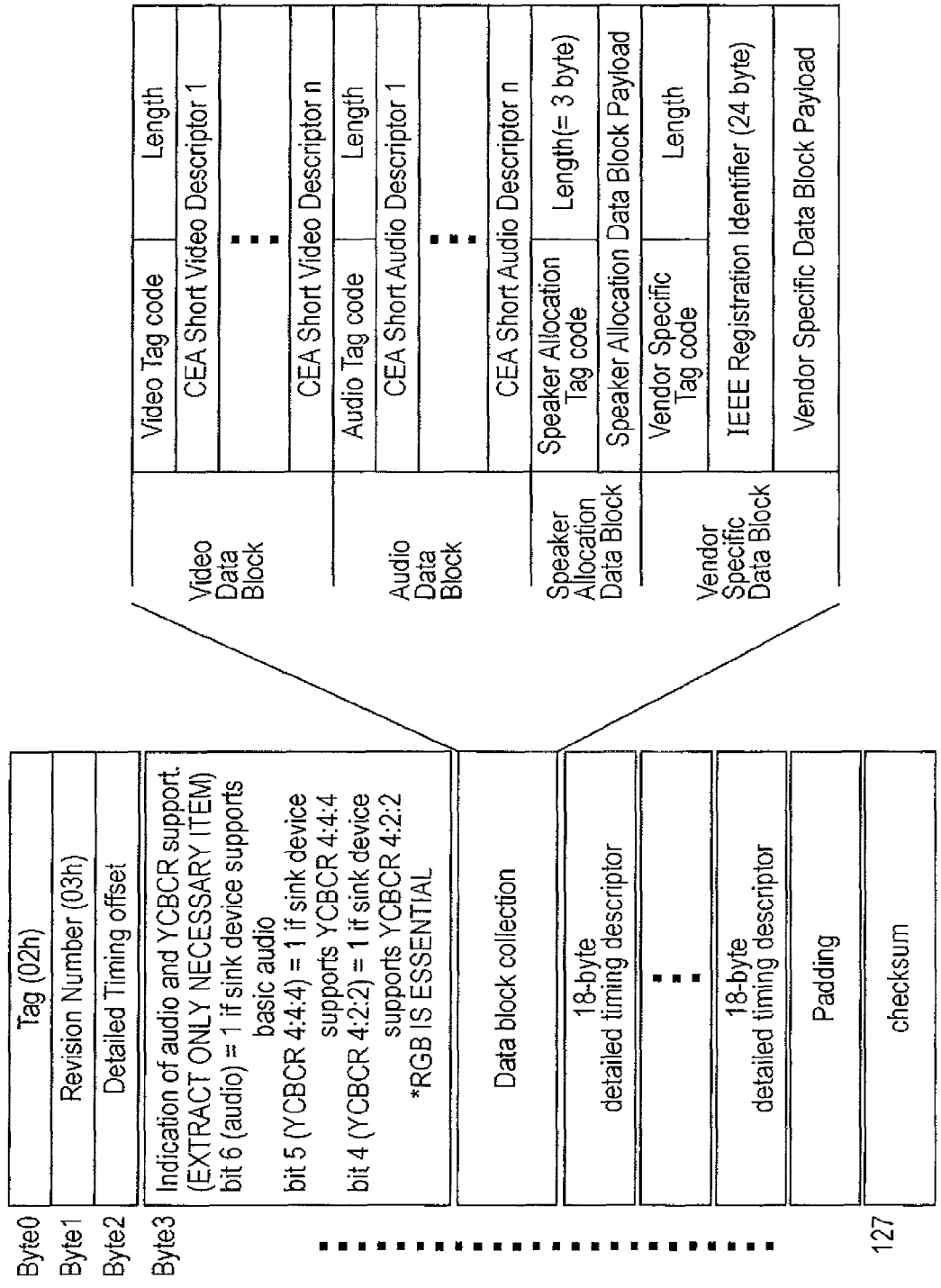
FIG. 12 is a view illustrating the structure of an E-EDID (extended portion for the HDMI, since block 1) included in the television receiver.

FIG. 12 illustrates an EDID structure (extended portion for HDMI since block 1). Although detailed description is omitted, the EDID structure is prescribed conforming to Electronic Industries Alliance/Consumer Electronics Association (EIA/CEA)-861B standard.

In the respective "CEA short audio descriptors" of an "audio data block", an audio format which can be reproduced by the television receiver (sink device) 300, the maximum number of channels, a sampling frequency, and the number of quantization bits are defined. The CPU 211 obtains the information about the compression format of the audio compression data stream which can be managed in the television receiver 300 based on the respective "CEA short audio descriptors".

The "CEA short audio descriptor" is divided into three kinds based on the difference in the audio format. FIG. 13A illustrates the specification of the "CEA short audio descriptor" corresponding to "audio code=1: Linear-PCM". FIG. 13B illustrates the specification of the "CEA short audio descriptor" corresponding to "audio codes=2 to 8". Meanwhile, the illustration of the specification of the "CEA short audio descriptor" corresponding to "audio codes=9 to 15" is omitted.

FIG. 14 illustrates the relationship between the "audio code" and the "audio format" (some parts are selected). For example, the "audio code=2" indicates that the "audio format" is AC-3. Since the "CEA short audio descriptor" of the "audio code=2" exists, the CPU 211 recognizes that the audio compression data stream corresponding to the AC-3 can be managed in the television receiver 300. Further, for example, the "audio code=6" indicates that the "audio format" is AAC. Since the "CEA short audio descriptor" of the "audio code=6" exists, the CPU 211 recognizes that the audio compression data stream of the AAC can be managed in the television receiver 300.

Further, FIG. 15 illustrates an example of the structure of an HDMI Vendor Specific Data Block (VSDB). In a 0-th block, a header which indicates the data region of data "vendor specific" represented as "vendor-specific tag code (=3)" is arranged. Further, in the 0-th block, information which indicates the length of the data "vendor specific" represented as "length (=N)" is arranged. Further, in a first to third blocks, information, which indicates the number "0x000003" registered for HDMI (R) represented as "24-bit IEEE registration identifier (0x000003) LSB first", is arranged.

A specific reserved bit of the HDMI Vendor Specific Data Block (VSDB), that is, one-bit compression compulsory flag represented as "FC_flg" in this example, is newly defined and arranged in, for example, the first bit of the sixth block. The compression compulsory flag is the information (compression compulsory flag information) used to request the transmission of the audio compression data stream from the set top box 200. When the transmission of the audio compression data stream is not requested, "FC_flg" becomes 0. On the other hand, when the transmission of the audio compression data stream is requested, it is defined that "FC_flg" becomes 1.

Meanwhile, in the example of the structure of the HDMI Vendor Specific Data Block (VSDB) of FIG. 15, the one-bit flag "FC_flg" is arranged in the first bit of the sixth block. However, the one-bit flag does not have to be arranged in the corresponding location. The flag "FC_flg" may be arranged in the location of another bit which is in a reserved state, for example, the second bit of the sixth block, the fourth bit of an eighth block, or the 0-th bit to second bit of a thirteenth block.

As described above, in the 3D image display system 10 shown in FIG. 1, the multiplexed data stream of the image compression data stream and the audio compression data stream is transmitted from the broadcasting station 100. Thereafter, the parallax information set is added to the audio compression data stream and then transmitted. Therefore, the parallax information set can be simply transmitted in such a way that the audio compression data stream is used as a container, and can be used by the television receiver 300.

Further, in the set top box 200 of the 3D image display system 10 shown in FIG. 1, if a specific condition is satisfied, the audio compression data stream is transmitted from the broadcasting station 100 to the television receiver 300 without change. Here, as the specific conditions, the compression format of the audio compression data stream is the compression format which can be managed in the television receiver 300, and the transmission of the audio compression data stream is requested by the television receiver 300.

Therefore, in the set top box 200, it is not necessary to perform a decoding process on the audio compression data stream, and the parallax information set is simply transmitted to the television receiver 300 while using the audio compression data stream as a container, thereby being used in the television receiver 300. In this case, a framing process is performed on the non-compression audio data conforming to IEC 60958 in the audio framing unit 208, so that a process in which the parallax information set is inserted into the added data region (Aux region) or the like is not necessary. That is, only the framing process is performed on the audio compression data stream conforming to IEC 60958 in the audio framing unit 208. Therefore, the process load of the set top box 200 can be reduced.

Further, in the set top box 200 of the 3D image display system 10 shown in FIG. 1, information which indicates whether the specific condition is satisfied or not is obtained by reading it from the EDIDROM 85 included in the television receiver 300. The information is information about the compression format of the audio compression data stream which can be managed in the television receiver 300 and the information (compression compulsory flag information) which indicates whether the transmission of the audio compression data stream is requested or not. Therefore, the time and effort of a user in order to input information can be omitted and the convenience of a user can be improved.

Further, in the set top box 200 of the 3D image display system 10 shown in FIG. 1, when the above-described specific condition is not satisfied, a decoding process is performed on the audio compression data stream, so that the non-compression audio data (PCM data) and the parallax information set are obtained. Thereafter, a framing process is performed on the non-compression audio data conforming to IEC 60958 and then the resulting data is transmitted from the set top box 200 to the television receiver 300. At this time, the parallax information set is inserted into the added data region (Aux region) and then transmitted. Therefore, the parallax information set can be transmitted from the set top box 200 to the television receiver 300, and can be used in the television receiver 300.

Further, in the television receiver 300 of the 3D image display system 10 shown in FIG. 1, the audio compression data stream to which the parallax information set is added is received and a decoding process performed thereon, so that the non-compression audio data and the parallax information set can be obtained. Therefore, parallax can be assigned to superimposition information (OSD display or graphic display of a widget or the like), which is superimposed on the left eye image and the right eye image, according to a superimposition location using the parallax information set. Therefore, with respect to the display of the superimposition information, the consistency of the perspective between respective objects within an image can be maintained in the optimal state.

2. Modified Embodiment

Meanwhile, according to the above-described embodiment, the broadcasting station 100 has a configuration in which the parallax information set corresponding to the left eye image data and the right eye image data which are included in the 3D image data is added to the audio compression data stream, and then transmitted. However, the specific information which is added to the audio compression data stream and then transmitted is not limited to the parallax information set.

Figure 16:
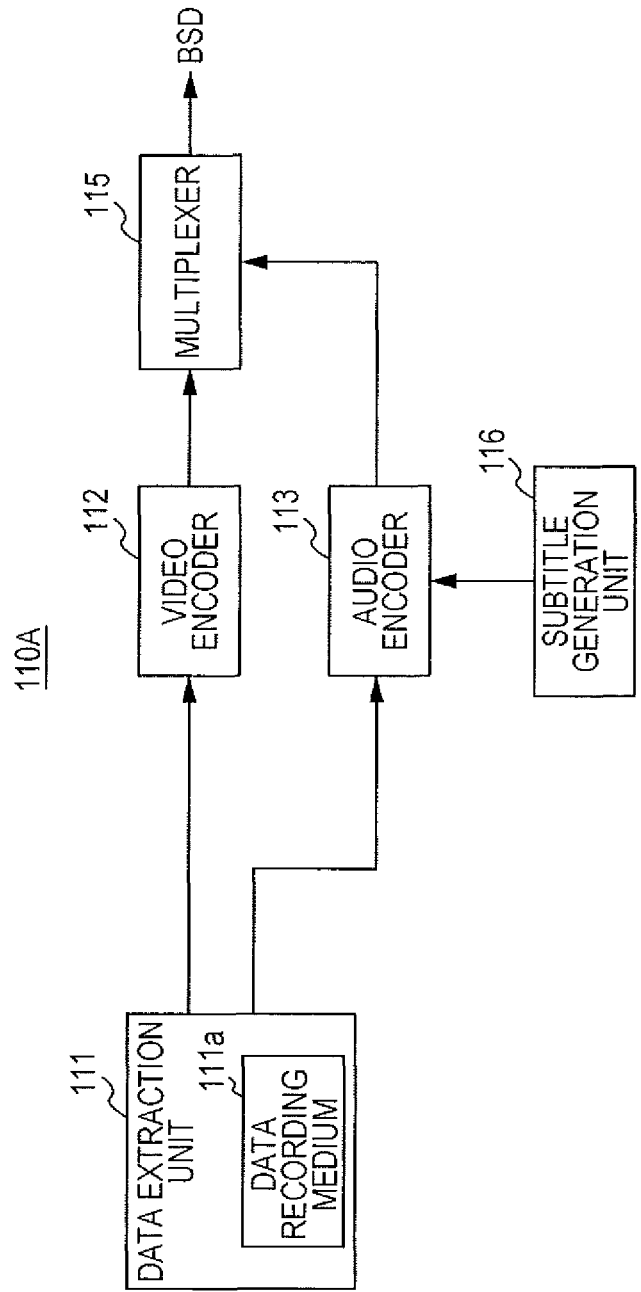
FIG. 16 is a block diagram illustrating an example of another configuration of the transmission data generation unit of the broadcasting station.

For example, superimposition information data, such as graphic information, text information, subtitle information, or the like, can be considered as specific information which is added to a audio compression data stream and then transmitted. FIG. 16 illustrates an example of the configuration of the transmission data generation unit 110A of the broadcasting station 100 in that case. The example is an example in which subtitle data is added to a audio compression data stream and then transmitted. The same reference numerals are used for the parts corresponding to those of FIG. 2, and the description thereof is appropriately omitted in FIG. 16.

The transmission data generation unit 110A includes a data extraction unit (archive unit) 111, a video encoder 112, an audio encoder 113, a multiplexer 115, and a subtitle generation unit 116. That is, in the transmission data generation unit 110A, the parallax information creation unit 114 of the transmission data generation unit 110 shown in FIG. 2 is substituted for the subtitle generation unit 116.

In the subtitle generation unit 116, subtitle data (closed caption data, subtitle data, subtitle text data according to an ARIB method, or the like) is generated. The audio encoder 113 adds the subtitle data generated in the above-described subtitle generation unit 116 to the audio compression data stream. Here, the subtitle data is inserted into a audio compression data stream as user data. Therefore, the subtitle data is transmitted using the audio compression data stream as a container. The other components of the transmission data generation unit 110A shown in FIG. 16 are configured and operated as in the transmission data generation unit 110 of FIG. 2.

Figure 17:
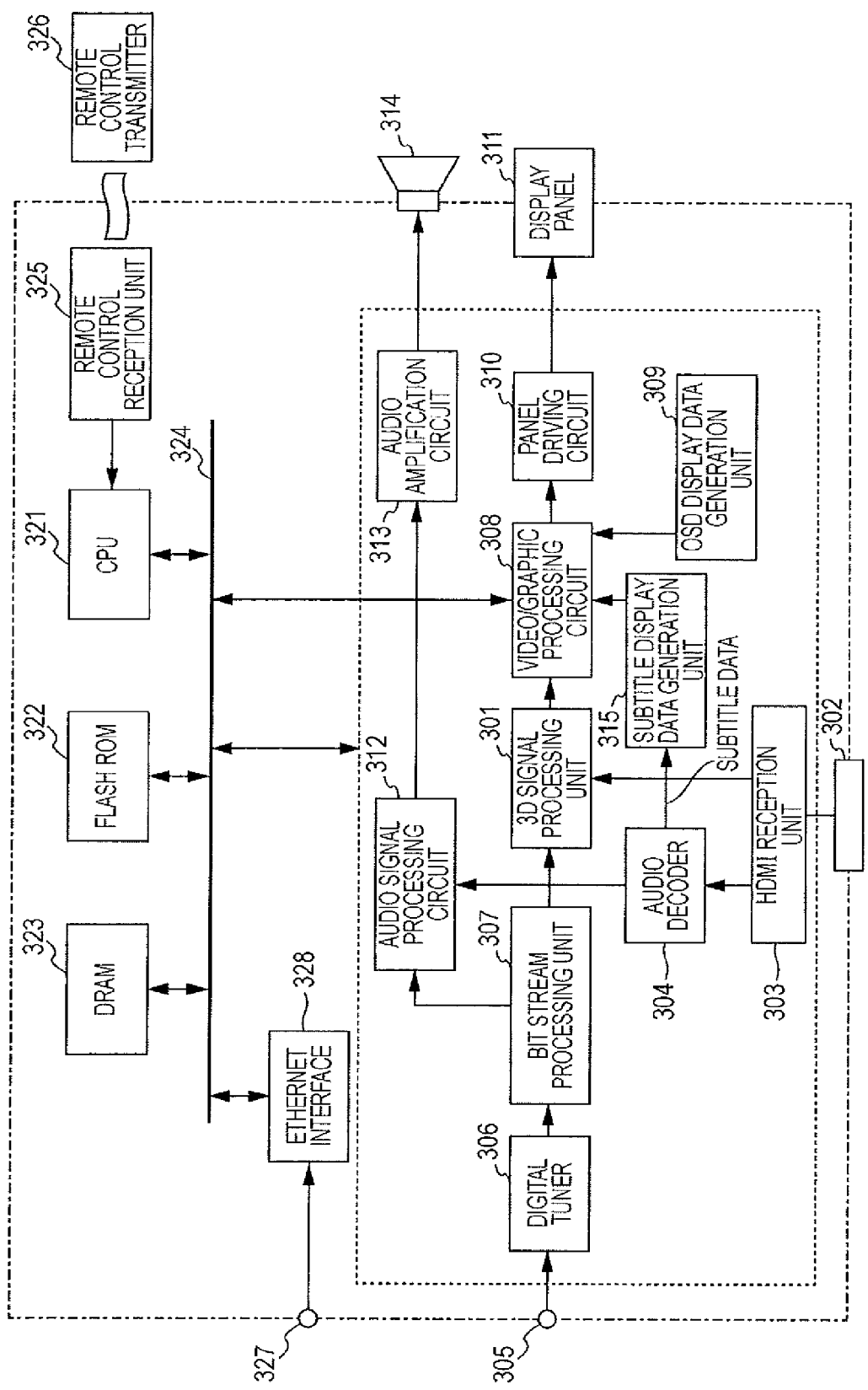
FIG. 17 is a block diagram illustrating an example of another configuration of the television receiver included in the 3D image display system.

FIG. 17 illustrates an example of the configuration of a television receiver 300A when the subtitle data is added to the audio compression data stream and then transmitted as described above. The same reference numerals are used for the parts corresponding to those of FIG. 10, and the description thereof is appropriately omitted in FIG. 17. A subtitle display data generation unit 315 that generates subtitle display data based on the subtitle data is provided in the television receiver 300A.

In the audio decoder 304, when the reception audio data of the HDMI reception unit 303 is the audio compression data stream, a decoding process is performed on the audio compression data stream, so that non-compression audio data (PCM data) and the subtitle data are obtained. Further, in the audio decoder 304, when the reception audio data of the HDMI reception unit 303 is the non-compression audio data, the decoding process is not performed, and the non-compression audio data and the subtitle data are output without change.

In the subtitle display data generation unit 315, subtitle display data (bitmap data) is generated based on the subtitle data obtained in the audio decoder 304. In this case, for example, left eye subtitle data and right eye subtitle data to which parallaxes are assigned are generated based on fixed parallax information which is previously set in the television receiver 300A. In the video/graphic processing circuit 308, the left eye subtitle data and the left eye subtitle data which are generated in the subtitle display data generation unit 315 are combined with left eye image data and right eye image data, respectively.

Therefore, the subtitle display data based on the subtitle data transmitted using the audio data as a container is superimposed on a 3D image and then displayed in the television receiver 300A. The other components of the television receiver 300A shown in FIG. 17 are configured and operated as in the transmission data generation unit 300 shown in FIG. 10.

Figure 18:
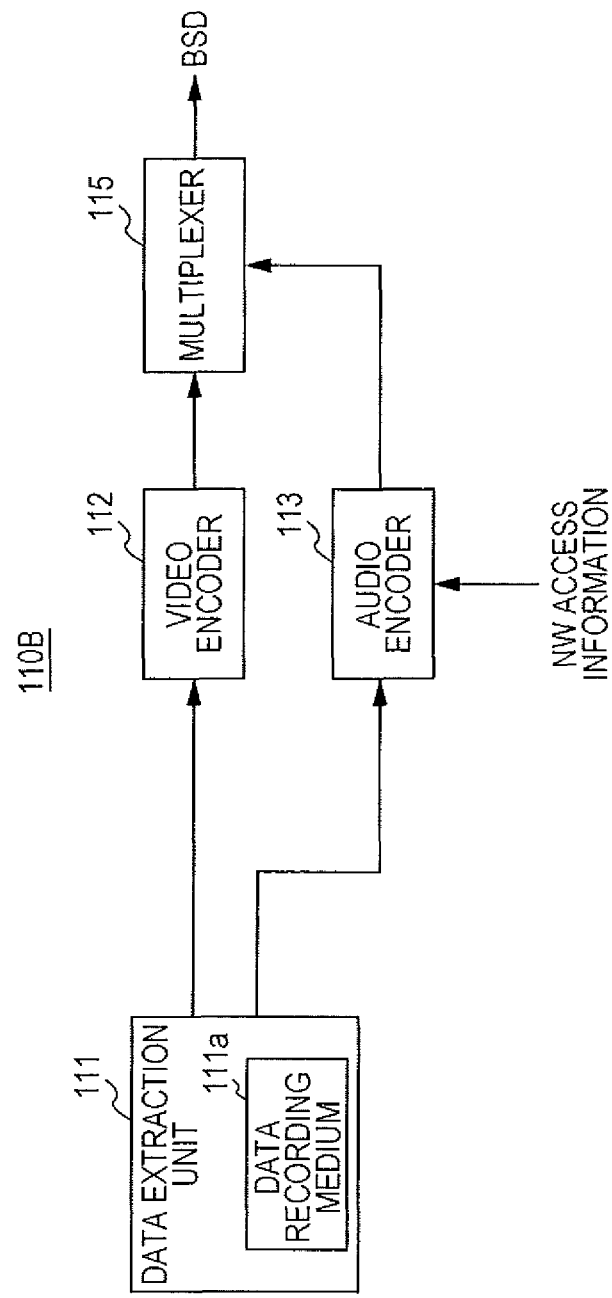
FIG. 18 is a block diagram illustrating an example of another configuration of the transmission data generation unit of the broadcasting station.

Further, for example, network access information, such as a Uniform Resource Locator (URL) or the like, can be considered as the specific information which is added to the audio compression data stream and then transmitted. FIG. 18 illustrates an example of the configuration of the transmission data generation unit 110B of the broadcasting station 100 in that case. The same reference numerals are used for the parts corresponding to those of FIG. 2, and the description thereof is appropriately omitted in FIG. 18.

In the transmission data generation unit 110B, the network access information (NW access information), such as a URL or the like, is supplied to the audio encoder 113. In the audio encoder 113, the network access information is added to the audio compression data stream. Here, the network access information is, for example, information, such as parallax information corresponding to transmission 3D image data from the Internet, subtitle information corresponding to transmission image data, sub audio data corresponding to the transmission image data or the like, or access information used to obtain other information.

Since the network access information is added to the audio compression data stream as described above, the network access information is transmitted using the audio compression data stream as a container. Here, the network access information is inserted into the audio compression data stream as user data. The other components of the transmission data generation unit 110B shown in FIG. 18 are configured and operated as in the transmission data generation unit 110 shown in FIG. 2.

Figure 19:
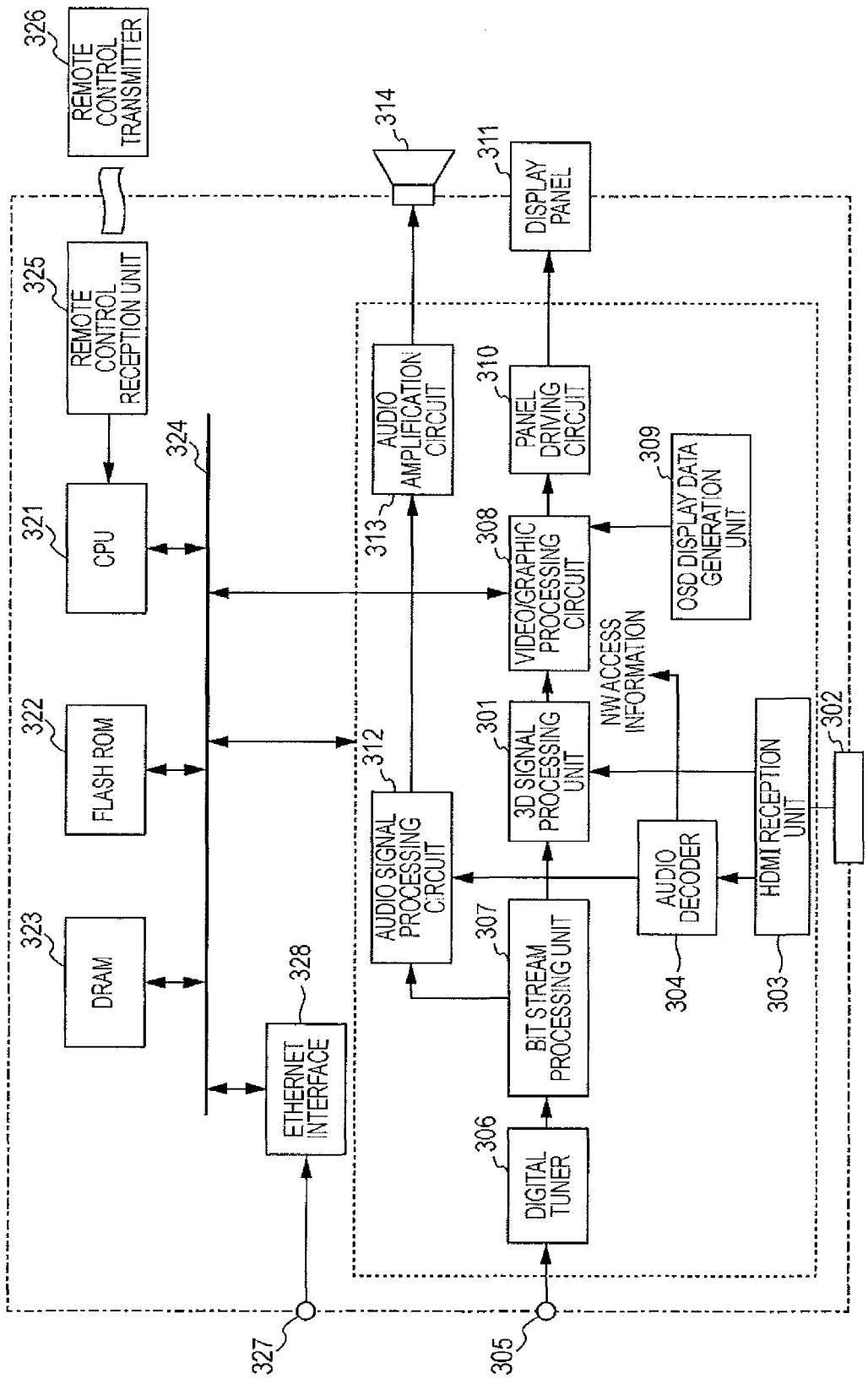
FIG. 19 is a block diagram illustrating an example of another configuration of the television receiver included in the 3D image display system.

FIG. 19 illustrates an example of the configuration of the television receiver 300B when the network access information (NW access information) is added to the audio compression data stream and then transmitted as described above. The same reference numerals are used for the parts corresponding to those of FIG. 10, and the description thereof is appropriately omitted in FIG. 19.

When the reception audio data of the HDMI reception unit 303 is the audio compression data stream, a decoding process is performed on the audio compression data stream, so that the non-compression audio data (PCM data) and the network access information are obtained in the audio decoder 304. Further, in the audio decoder 304, when the reception audio data of the HDMI reception unit 303 is the non-compression audio data, the decoding process is not performed, and the non-compression audio data and the network access information are output without change.

The network access information obtained in the audio decoder 304 is supplied to a CPU 321. The CPU 321 controls an Ethernet interface 328 based on the network access information, and obtains information, such as parallax information, subtitle information, or sub audio data, from the Internet. For example, the parallax information obtained in the Ethernet interface 328 is supplied to the video/graphic processing circuit 308, and is used to assign parallax to superimposition information, such as OSD, which is superimposed on the left eye image and the right eye image.

Further, for example, the subtitle information obtained in the Ethernet interface 328 is supplied to the video/graphic processing circuit 308, and is superimposed on the left eye image and the right eye image. Further, for example, the sub audio data obtained in the Ethernet interface 328 is supplied to the audio signal processing circuit 312, and sub audio is selectively output from a speaker 314. The other components of the television receiver 300B shown in FIG. are configured and operated as in the transmission data generation unit 300 shown in FIG. 10.

Meanwhile, in the above-described embodiment, the set top box 200 transmits the audio compression data stream from the broadcasting station 100 to the television receiver 300 without change under the following conditions. The conditions are that the compression format of the audio compression data stream is a compression format that can be managed in the television receiver 300, and that the television receiver 300 requests the transmission of the audio compression data stream.

However, when the compression format of the audio compression data stream is the compression format which can be managed in the television receiver 300, a configuration in which a decoding process is not performed on the reception audio compression data stream and the reception audio compression data stream is transmitted to the television receiver 300 without change can be considered. In this case, with respect to the television receiver 300, it is not necessary to arrange information which indicates whether the transmission of the audio compression data stream is requested or not on the HDMIVSDB.

Further, in the embodiment, it is configured that the set top box 200 receives the 3D image data based on the broadcasting signal from the broadcasting station 100. However, a configuration in which the set top box 200 receives the 3D image data and the audio data from a streaming server via a network may be considered.

Further, in the above-described embodiment, it is configured that the set top box 200 directly transmits the 3D image data and the audio data received in the digital tuner 204 to the television receiver 300. However, it can be considered that the set top box 200 stores the 3D image data and the audio data received in the digital tuner 204 in storage (not shown) temporarily. In this case, it is configured that the 3D image data and the audio data is read from the storage at a specific timing, and then transmitted to the television receiver 300. The specific timing is, for example, a timing for operating reproduction by a user, or the like.

Further, in the above-described embodiment, it is configured that the set top box 200 transmits the reception 3D image data and the reception audio data to the television receiver 300. However, a configuration in which the reception 3D image data and the reception audio data is transmitted to a monitor apparatus, a projector, or the like instead of the television receiver 300 may be considered. Further, a configuration in which a recorder having a reception function, personal computer, or the like is used instead of the set top box 200 may be considered.

Further, in the above-described embodiment, the set top box 200 is connected with the television receiver 300 through the HDMI cable 400. However, the present disclosure can be applied in the same manner to the case where the set top box 200 is connected with the television receiver 300 in a wired manner using a digital interface which is the same as the HDMI, and furthermore, the case where the set top box 200 is connected with the television receiver 300 wirelessly.

Figure 20:
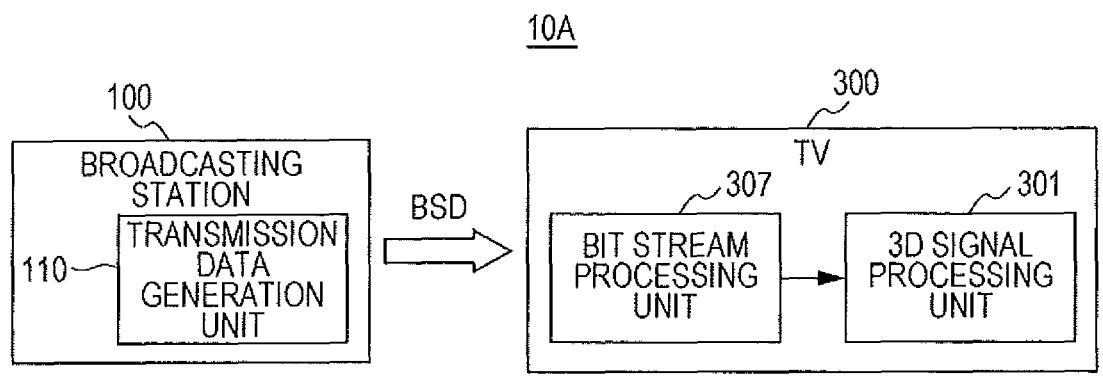
FIG. 20 is a block diagram illustrating an example of another configuration of the 3D image display system.
Figure 21:
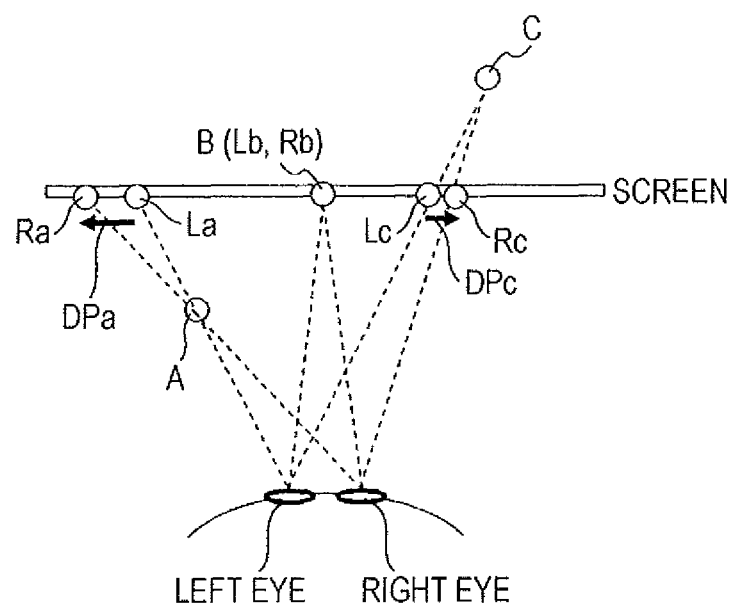
FIG. 21 is a view illustrating the relationship between display locations of the right and left images of an object on a screen and the reproduction locations of the 3D images thereof when the 3D images are displayed using binocular parallax.

Further, in the above-described embodiment, it is illustrated that the 3D image display system 10 includes the broadcasting station 100, the set top box 200, and the television receiver 300. However, the television receiver 300 includes the bit stream processing unit 307 which functions as the bit stream processing unit 201 in the set top box 200 as shown in FIG. 10. Therefore, a 3D image display system 10A which includes a broadcasting station 100 and a television receiver 300 as shown in FIG. 20 can be considered.

Further, in the above-described embodiment, an example in which the data stream (bit stream data) which includes the 3D image data is broadcasted from the broadcasting station 100 has been described. However, the present disclosure can be applied to a system having a configuration in which a data stream is delivered to a reception terminal using a network, such as the Internet or the like, in the same manner.

It should be understood by those skilled in the art that various modifications, combinations, sub-combinations and alterations may occur depending on design requirements and other factors insofar as they are within the scope of the appended claims or the equivalents thereof.

What is claimed is:

1. A transmission apparatus comprising:
a processing device configured to:
obtain an audio compression data stream having audio packets into which specific information is inserted as user data, in which the audio compression data stream forms a multiplexed data stream from which the audio compression data stream is obtained, the audio compression data stream used as a container of the specific information; and
transmit the audio compression data stream obtained to an external equipment through a transmission path, in which the audio compression data stream obtained is transmitted without change through the transmission path, based on (i) a result of a determination whether a first information included as flag information in a storage unit of the external equipment and obtained from the external equipment indicates transmission of the audio compression data stream without change is requested and (ii) a result of a second determination whether second information included in and obtained from the storage unit of the external equipment, in which the second information indicates a compression format which can be managed in the external equipment, indicates a compression format of the audio compression data stream obtained can be managed in the external equipment, in which the first information and the second information are different from each other, and in which the first information and the second information are other than for direct selection by a user of the external equipment.

2. The transmission apparatus according to claim 1, wherein the processing device is configured to obtain non-compression audio data and the specific information by performing a decoding process on the audio compression data stream, based on a result of a third determination from the second information that at least the compression format of the audio compression data stream obtained can be managed in the external equipment, or the first information does not indicate transmission of the audio compression data stream without change is requested, wherein the processing device is configured to transmit the non-compression audio data and the specific information to the external equipment through the transmission path.

3. The transmission apparatus according to claim 1, wherein the processing device is configured to read and obtain the second information and the first information from the storage unit included in the external equipment through the transmission path.

4. The transmission apparatus according to claim 1, wherein the processing device is configured to transmit 3D image data having left eye image data and right eye image data used to display a 3D image to the external equipment through the transmission path, and
wherein the specific information which is added to the audio compression data stream is parallax information used to assign parallax by shifting superimposition information which is superimposed on an image based on the left eye image data and the right eye image data used to display the 3D image data.

5. The transmission apparatus according to claim 1, wherein the processing device is configured to transmit image data to the external equipment through the transmission path, and
wherein the specific information which is added to the audio compression data stream is superimposition information data which is superimposed on an image based on the image data.

6. The transmission apparatus according to claim 1, wherein the processing device is configured to transmit image data to the external equipment through the transmission path, and
wherein the specific information which is added to the audio compression data stream is network access information used to obtain information related to the image data.

7. The transmission apparatus of claim 1, wherein the flag information in a first state indicates transmission of the audio compression data stream without change is requested and in a second state indicates transmission of the audio compression data stream without change is not requested.

8. The transmission apparatus of claim 1, wherein the first information is indicated in a vendor specific data block of self-performance data for the external equipment, in which the self-performance data includes the second information and is stored in the storage unit of the external equipment.

9. A transmission method comprising:
obtaining an audio compression data stream having audio packets into which specific information is inserted as user data, in which the specific information is contained in the audio compression data stream which forms a multiplexed data stream from which the audio compression data stream is obtained, the audio compression data stream used as a container of the specific information; and
transmitting the audio compression data stream obtained to an external equipment, in which the audio compression data stream obtained is transmitted without change, based on (i) a result of determination whether a first information included as flag information in a storage unit of the external equipment and obtained from the external equipment indicates transmission of the audio compression data stream without change is requested and (ii) a result of a second determination whether second information included in and obtained from the storage unit of the external equipment, in which the second information indicates a compression format which can be managed in the external equipment, indicates a compression format of the audio compression data stream obtained can be managed in the external equipment, in which the first information and the second information are different from each other, and in which the first information and the second information are other than for direct selection by a user of the external equipment.

10. A reception apparatus comprising:
a processing device configured to:
receive an audio compression data stream having audio packets into which specific information is inserted as user data, from an external equipment through a transmission path, in which in the transmission path the audio compression data stream is used as a container of the specific information; and
obtain non-compression audio data and the specific information by performing a decoding process on the audio compression data stream received,
in which the audio compression data stream received is transmitted from the external equipment without change through the transmission path, based on (i) a result of a determination at the external equipment whether a first information included as flag information in a storage unit of the reception apparatus and obtained from the reception apparatus indicates transmission of the audio compression data stream without change is requested and (ii) a result of a second determination at the external equipment whether second information included in and obtained from the storage unit of the reception apparatus, in which the second information indicates a compression format which can be managed in the reception apparatus, indicates a compression format of the audio compression data stream can be managed in the reception apparatus, in which the first information and the second information are different from each other, and in which the first information and the second information are other than for direct selection by a user of the reception apparatus.

11. The reception apparatus according to claim 10, wherein the processing device is configured to: assign the parallax to the same superimposition information which is superimposed on a left eye image and a right eye image using the left eye image data and the right eye image data included in the 3D image data and using the parallax information, and obtain data of the left eye image on which the superimposition information is superimposed and data of the right eye image on which the superimposition information is superimposed, and
receive 3D image data having left eye image data and right eye image data used to display a 3D image,
wherein the specific information is parallax information used to assign parallax by shifting superimposition information which is superimposed on an image based on the left eye image data and the right eye image data used to display the 3D image data.

12. The reception apparatus according to claim 10, wherein the processing device is configured to:
obtain data of the image to which the superimposition information is superimposed using the image data received and the superimposition information data,
receive image data, and
wherein the specific information is superimposition information data which is superimposed on an image including the image data received.

13. The reception apparatus according to claim 10, wherein the processing device is configured to:

obtain information related to the image data from a network using network access information obtained by the processing device, and receive image data, wherein the specific information is the network access information used to obtain information related to the image data.

14. A reception method for a reception apparatus, the method comprising:

receiving an audio compression data stream having audio packets into which specific information is inserted as user data, from an external equipment through a transmission path, in which in the transmission path the audio compression data stream is used as a container of the specific information; and obtaining non-compression audio data and specific data by performing a decoding process on the audio compression data stream received, in which the audio compression data stream received is transmitted from the external equipment without change through the transmission path, based on (i) a result of a determination at the external equipment whether a first information included as flag information in a storage unit of the reception apparatus and obtained from the reception apparatus indicates transmission of the audio compression data stream without change is requested and (ii) a result of a second determination at the external equipment whether second information included in and obtained form the storage unit of the reception apparatus, in which the second information indicates a compression format which can be managed in the reception apparatus, indicates a compression format of the audio compression data stream can be managed in the reception apparatus, in which the first information and the second information are different from each other, and in which the first information and the second information are other than for direct selection by a user of the reception apparatus.

15. A transmission/reception system comprising:

a transmission apparatus and a reception apparatus which are connected to each other through a transmission path, wherein the transmission apparatus includes a first processing device configured to:

obtain an audio compression data stream having audio packets into which specific information is added as user data, in which the audio compression data stream forms a multiplexed data stream from which the audio compression data stream is obtained, the audio compression data stream used as a container of the specific information; and transmit the audio compression data stream obtained to the reception apparatus through the transmission path, in which the audio compression data stream obtained is transmitted without change through the transmission path, based on (i) a result of a determination whether a first information included as flag information in a storage unit of the reception apparatus and obtained from the reception apparatus indicates transmission of the audio compression data stream without change is requested and (ii) a result of a second determination whether second information included in and obtained from the storage unit of the reception apparatus, in which the second information indicates a compression format which can be managed in the reception apparatus, indicates a compression format of the audio compression data obtained can be managed in the reception apparatus, in which the first information and the second information are different from and external to each other, and in which the first information and the second information are other than for direct selection by a user of the reception apparatus, and wherein the reception apparatus includes a second processing device configured to:

receive the audio compression data stream into which the specific information is inserted through the transmission path, in which in the transmission path the specific information is contained in the audio compression data stream; and obtain non-compression audio data and the specific information by performing a decoding process on the audio compression data stream received.

* * * * *